US010140637B2

(12) United States Patent
Zamer

(10) Patent No.: US 10,140,637 B2
(45) Date of Patent: Nov. 27, 2018

(54) CUSTOMER SELECTION DETERMINATION SYSTEM

(71) Applicant: PAYPAL, INC., San Jose, CA (US)

(72) Inventor: Kamal Zamer, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 561 days.

(21) Appl. No.: 14/206,837

(22) Filed: Mar. 12, 2014

(65) Prior Publication Data

US 2015/0262269 A1 Sep. 17, 2015

Related U.S. Application Data

(60) Provisional application No. 61/909,070, filed on Nov. 26, 2013.

(51) Int. Cl.
*G06Q 30/06* (2012.01)
*H04W 4/02* (2018.01)

(52) U.S. Cl.
CPC .......... *G06Q 30/0601* (2013.01); *H04W 4/02* (2013.01)

(58) Field of Classification Search
CPC .................................................. G06Q 30/0639
See application file for complete search history.

(56) References Cited

U.S. PATENT DOCUMENTS

| | | | |
|---|---|---|---|
| 2006/0133831 A1* | 6/2006 | Rommelmann | ... G03G 21/1892 399/12 |
| 2012/0259732 A1* | 10/2012 | Sasankan | ............. G01S 5/0205 705/26.9 |
| 2013/0179303 A1* | 7/2013 | Petrou | ................ G06Q 30/0623 705/26.61 |
| 2016/0196575 A1* | 7/2016 | Uchida | ............. G06Q 30/0261 705/14.45 |

* cited by examiner

*Primary Examiner* — Sheetal R Paulson
(74) *Attorney, Agent, or Firm* — Haynes and Boone, LLP

(57) ABSTRACT

Systems and methods for determining a customer selection include receiving customer location information from at least one beacon device of a plurality of beacon devices that are located in a physical merchant location. The customer location information is collected by the at least one beacon device from a customer device that is associated with a customer. Customer selection indication data that is indicative of at least one physical gesture made by the customer is also received, and may be collected, for example, by cameras, object detection devices, communications between customer devices, etc. The customer location information and the customer selection indication data is then analyzed to determine a first product location in the physical merchant location that the customer is selecting, and a first product that is associated with the first product location in a database is determined. Information about the first product may then be sent to the customer device.

20 Claims, 22 Drawing Sheets

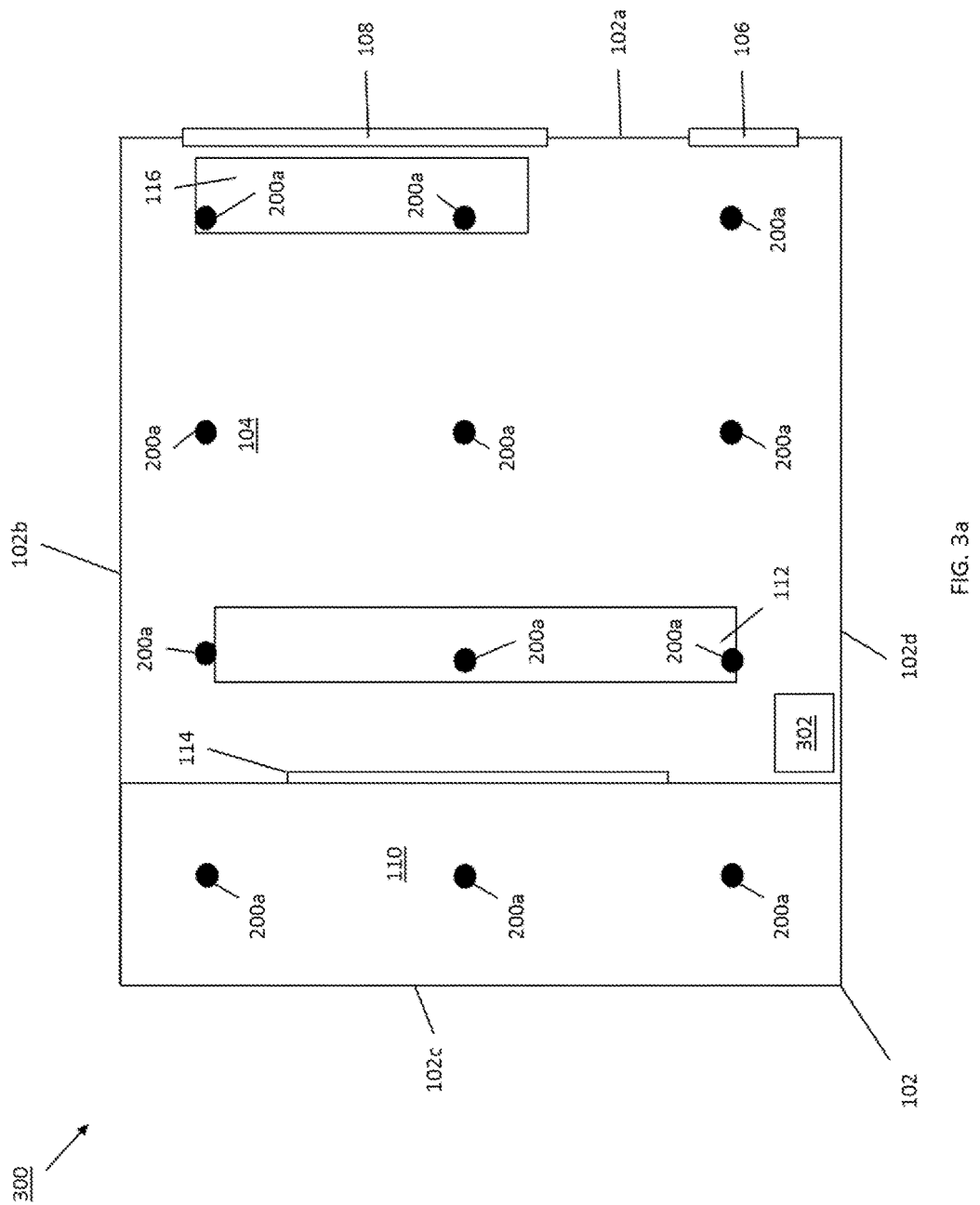

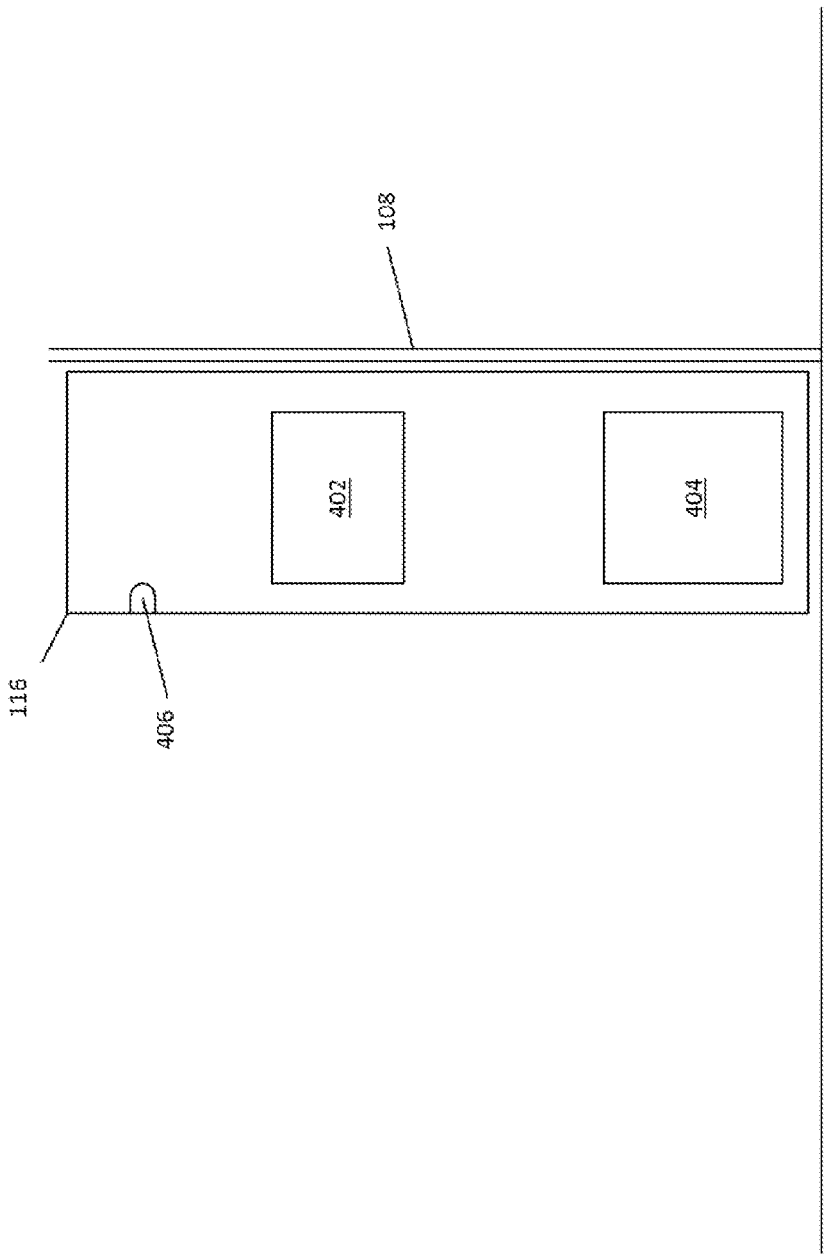

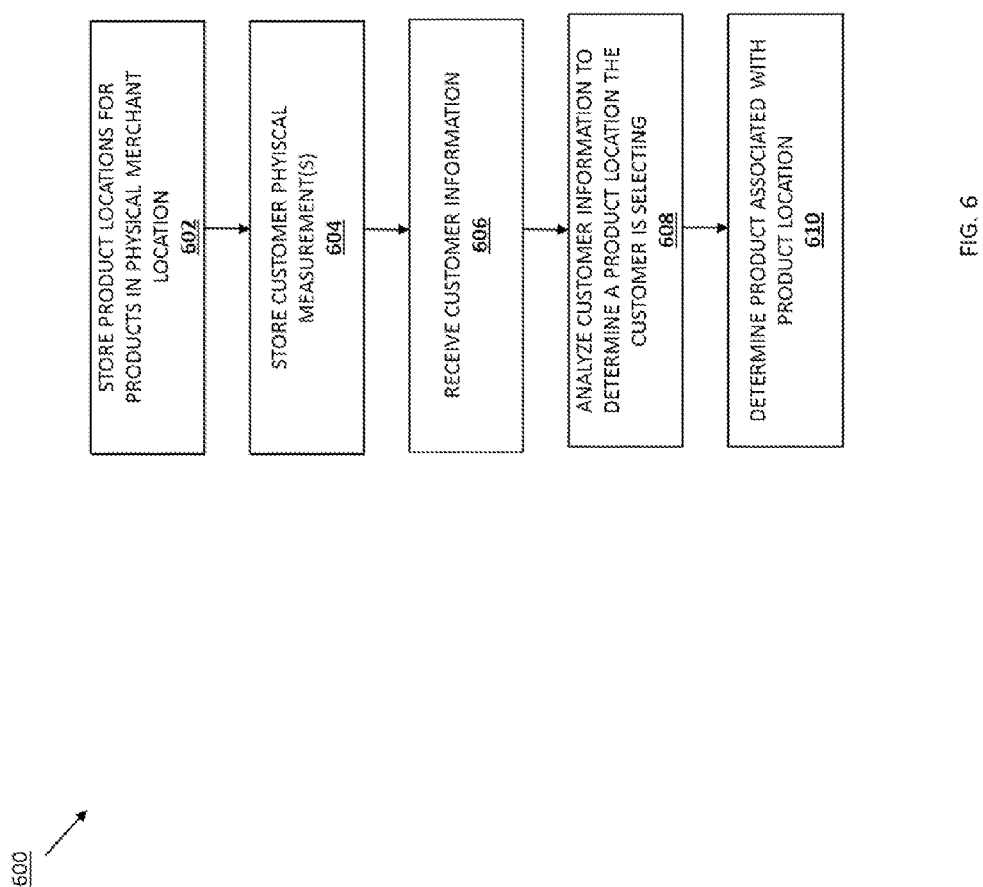

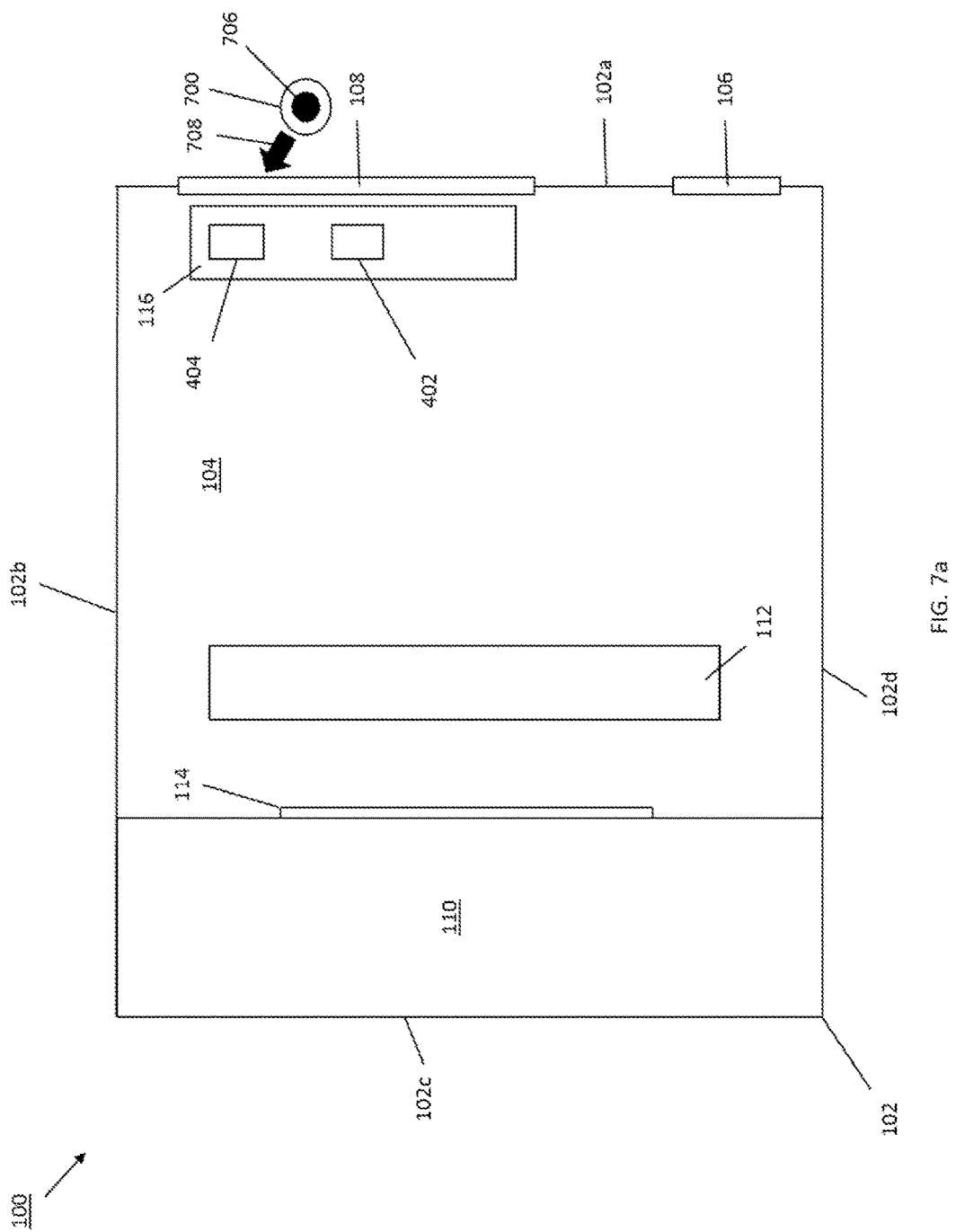

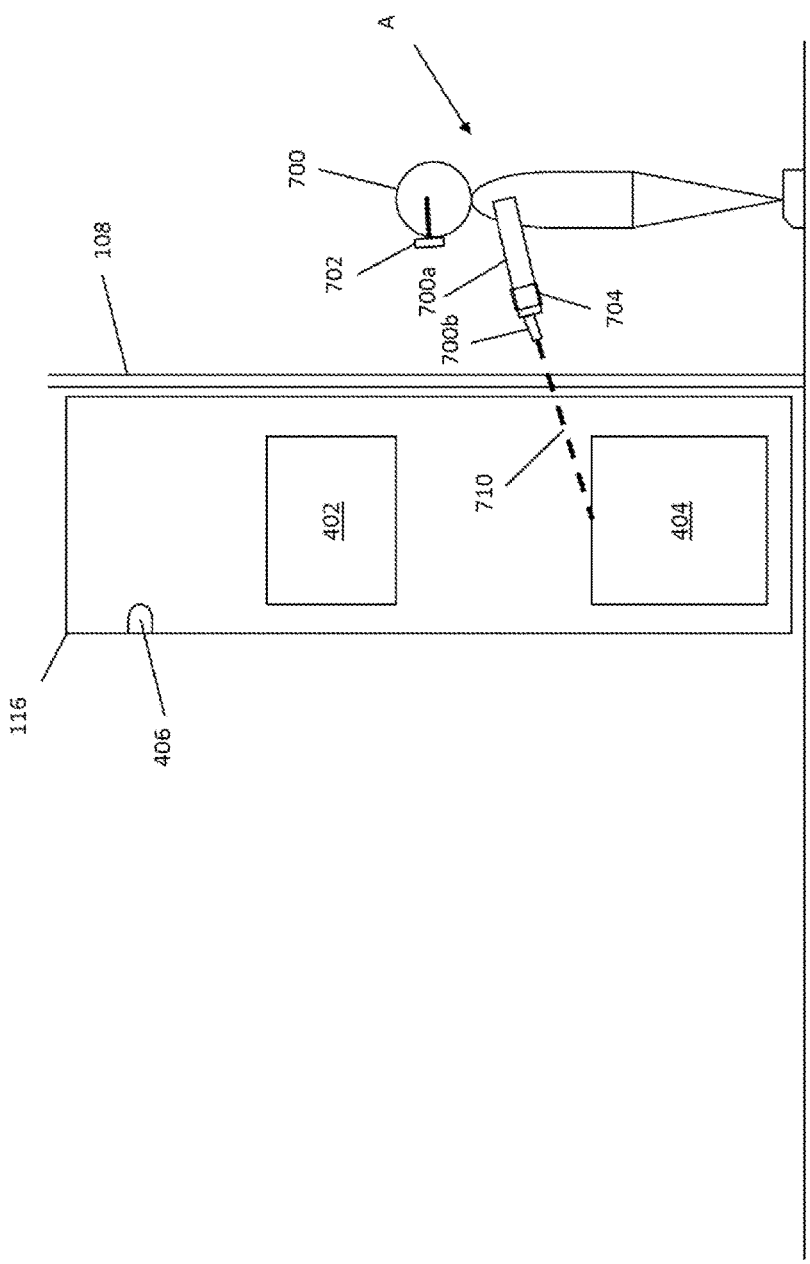

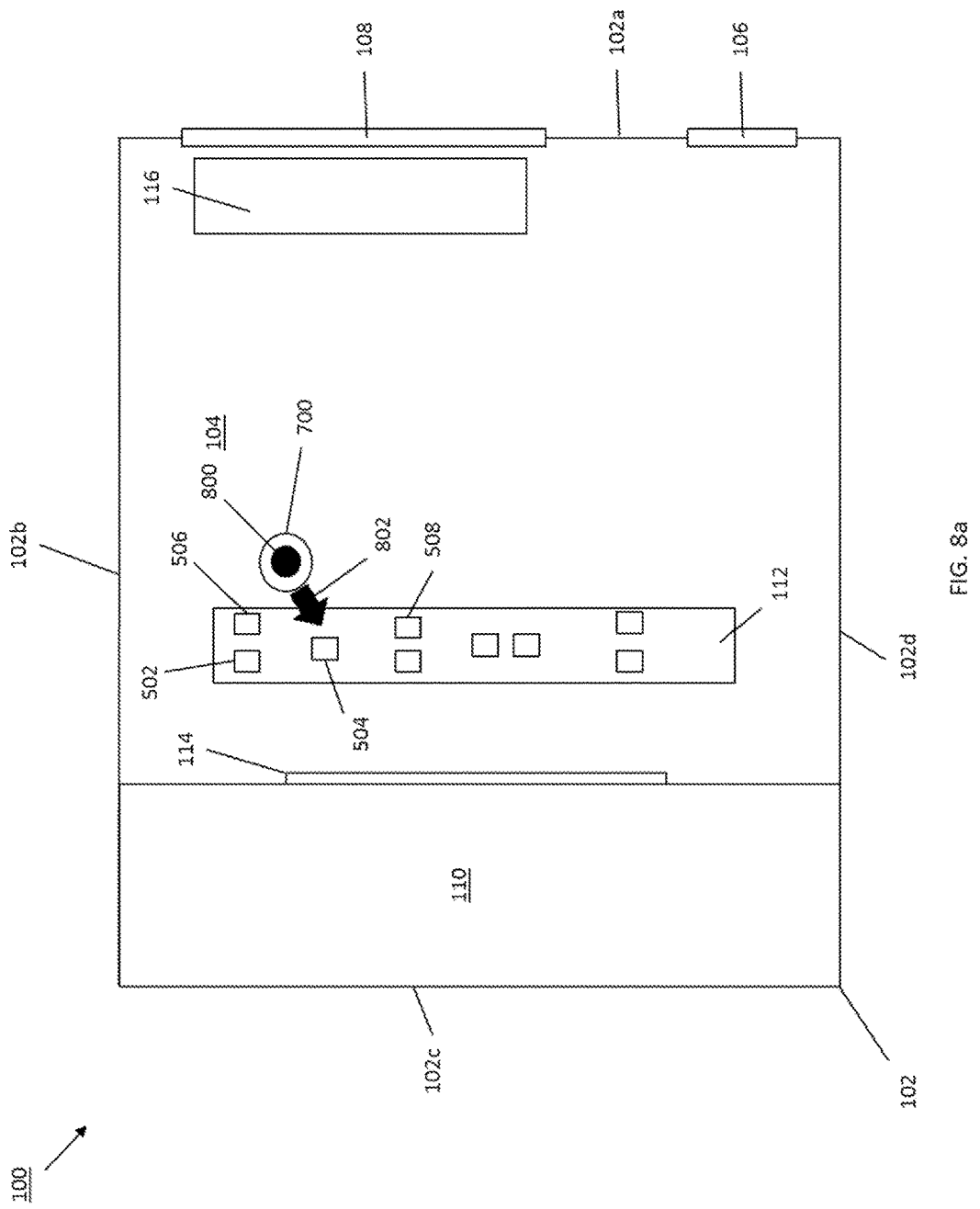

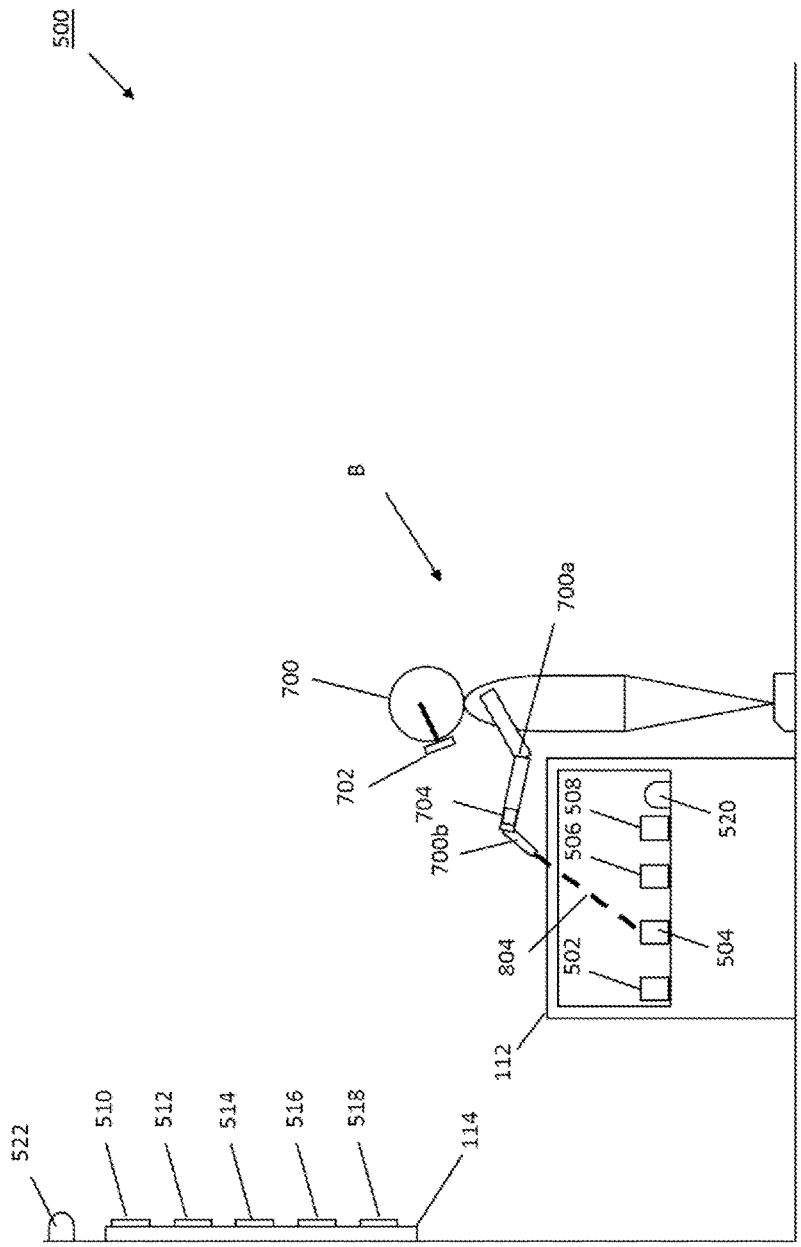

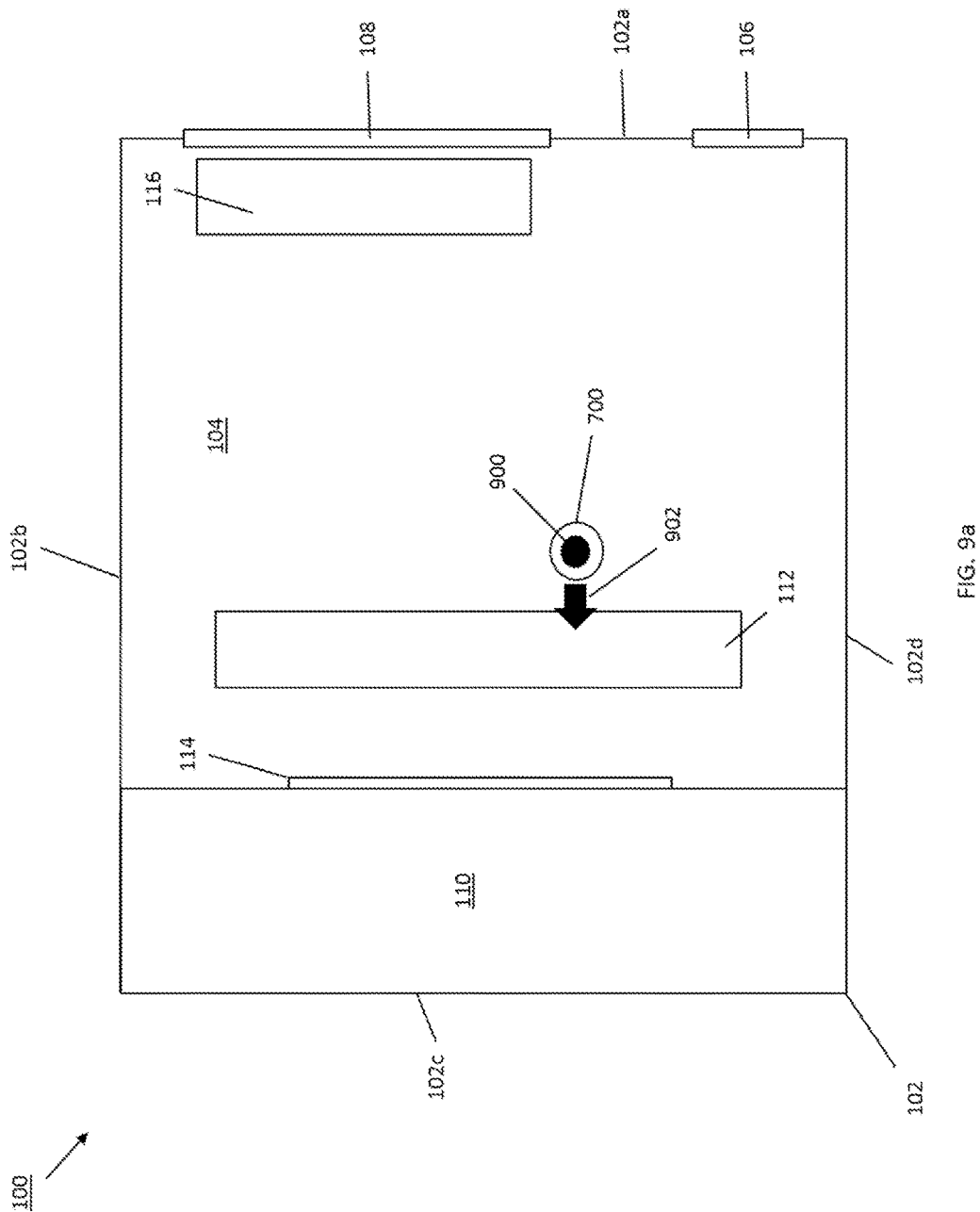

CUSTOMER SELECTION DETERMINATION SYSTEM

BACKGROUND

Field of the Invention

The present disclosure generally relates to physical merchant locations, and more particularly to systems and methods for determining customer selections in physical merchant locations.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with physical merchant locations. For example, payment service providers may provide the online and/or mobile payment services discussed above to allow customers to purchase products offered by a merchant at a physical merchant location. In some situations, merchant may provide products, product indicators, and/or other product-related items in the physical merchant location such that they are physically inaccessible to customers. For example, merchants may provide products behind a store window or in a display case (e.g., jewelry), may provide product indicators behind a counter (e.g., a menu including food products for sale), and/or may provide a variety of other product-related items in a variety of customer-inaccessible locations known in the art. When products and product indicators are provided by a merchant such that they are physically inaccessible to customers, this requires the customers to point, gesture towards, or otherwise attempt to indicate to the merchant a selection of the product or product indicator. In response, the merchant must then guess which of the products or product identifiers the customer has selected in order to provide that product (or information about that product) to the customer. The need for the merchant to guess which of a plurality of products a customer has selected is error-prone, time consuming, and frustrating for both the merchant and the customer.

Thus, there is a need for an improved customer selection determination system.

BRIEF DESCRIPTION OF THE FIGURES

FIG. 3a is a schematic top view illustrating an embodiment of a customer selection determination system that includes a plurality of the beacon devices of FIG. 2 in the physical merchant location of FIG. 1;

FIG. 4 is a schematic side view illustrating an embodiment of a portion of the physical merchant location of FIG. 1.

FIG. 6 is a flow chart illustrating an embodiment of a method for recommending merchant actions;

FIG. 7a is a schematic top view illustrating an embodiment of a customer making a selection at the physical merchant location of FIG. 1;

FIG. 7b is a schematic side view illustrating an embodiment of the customer of FIG. 7a making the selection at the physical merchant location of FIG. 1;

FIG. 8a is a schematic top view illustrating an embodiment of a customer making a selection at the physical merchant location of FIG. 1;

FIG. 8b is a schematic side view illustrating an embodiment of the customer of FIG. 8a making the selection at the physical merchant location of FIG. 1;

FIG. 9a is a schematic top view illustrating an embodiment of a customer making a selection at the physical merchant location of FIG. 1;

Figure 1:
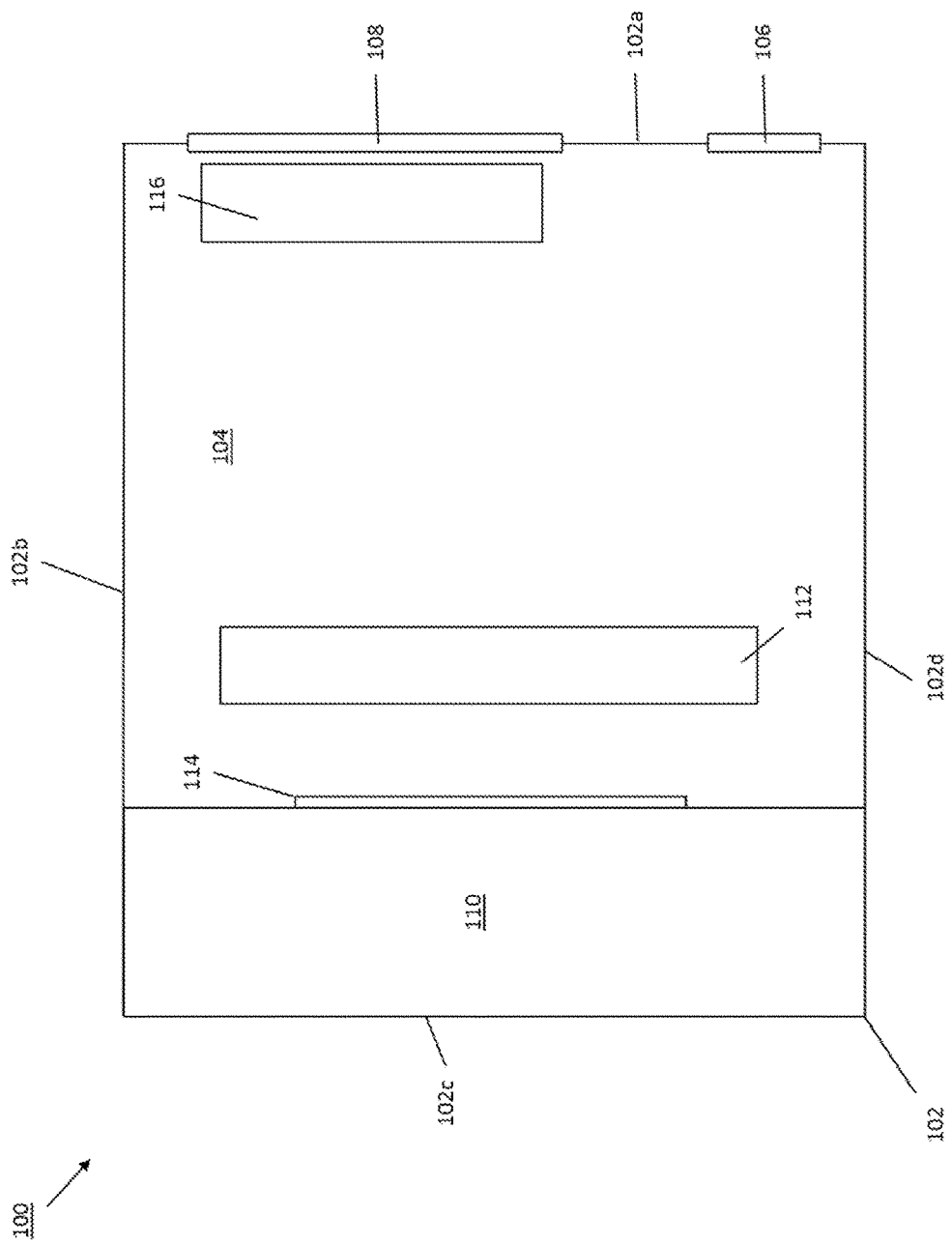
FIG. 1 is a schematic top view illustrating an embodiment of a physical merchant location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for determining customer selections at a physical merchant location by automatically determining a product or product identifier in the merchant physical location that a customer is pointing at, gesturing towards, or otherwise selecting, and providing information about, or indications of, that product or product identifier to the merchant, the customer, or both. A variety of information related to the customer may be collected to determine the product or product identifier that the customer is selecting. For example, a customer device location and customer device orientation may be retrieved from a customer device of the customer to determine the relative location and orientation of the customer in the physical merchant location. Cameras, three-dimensional object recognition systems, and/or other devices may be also used to capture and/or identify physical gestures made by the customer. The information collected about the customer may then be analyzed and the results used to reference a database of product locations for products within the physical merchant location in order to determine a product in the physical merchant location that the customer is selecting. In different embodiments, the determination of that product may be used to inform the merchant which product the customer is selecting, to provide product information about that product to the customer, to provide a visual indication in the physical merchant location of the product the customer is selecting, to allow the customer to build a product list for purchasing, and/or to provide a variety of other benefits that will be apparent to one of skill in the art in possession of the present disclosure.

Referring now to FIG. 1, an embodiment of a physical merchant location 100 is illustrated. The physical merchant location 100 includes a merchant building 102 having a plurality of exterior walls 102a, 102b, 102c, and 102d that define a physical merchant location interior 104. The exterior wall 102a includes an exterior door 106 (e.g., a "front" door in the illustrated embodiment) and an exterior window 108. In the illustrated embodiment, the physical merchant location interior 104 includes a merchant employee area 110, a product display counter 112, a product indicator display 114 located behind the product display counter 112, and a product display 116 located adjacent the exterior window 108.

In one example, the physical merchant location 100 is a restaurant, the merchant employee area 110 is a kitchen, the product display counter 112 is an ordering counter that may display food or drinks available for purchase in the restaurant, the product indicator display 114 is a menu, and the product display 116 displays food or drinks that are available for purchase at the physical merchant location 100 through the exterior window 108. In another example, the physical merchant location 100 is a clothing store, the merchant employee area 110 is a clothing stock room, the product display counter 112 displays clothing accessories for purchase, the product indicator display 114 is a clothing advertisement for one or more clothing products available at the physical merchant location 100, and the product display 116 displays clothing that is available for purchase at the physical merchant location 100 through the exterior window 108. In another example, the physical merchant location 100 is a jewelry store, the merchant employee area 110 is a jewelry stock room, the product display counter 112 displays jewelry for purchase, the product indicator display 114 is a jewelry menu or advertisement for one or more jewelry products available at the physical merchant location 100, and the product display 116 displays jewelry that is available for purchase at the physical merchant location 100 through the exterior window 108. However, while a few examples are discussed below, one of skill in the art in possession of the present disclosure will recognize that a wide variety of physical merchant locations will benefit from the teachings of the present disclosure and thus will fall within its scope.

Figure 2:
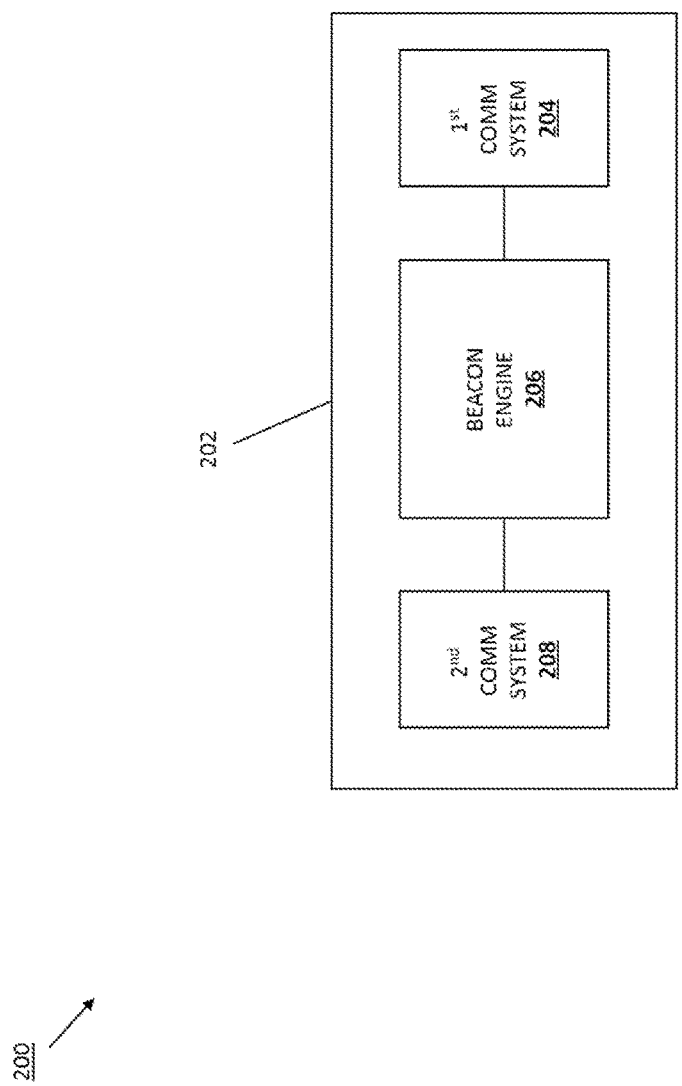
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instructions on a memory system (not illustrated) in the beacon device 200 that, when executed by a processing system (not illustrated) in the beacon device 200, cause the processing system to perform the functions of the beacon devices 200 discussed below. The beacon engine 206 is coupled to a second communication system 208 such as, for example, a Bluetooth® Low Energy (BLE) communication system. The beacon engine 206 may be configured to receive any of a variety of sensor signals through the second communication system 208 and transmit those sensor signals using the first communication system 205. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. The chassis 202 of the beacon device 200 may include any of a variety of features that allow for the coupling of the beacon device to different areas in a physical merchant location, discussed below.

Figure 3B:
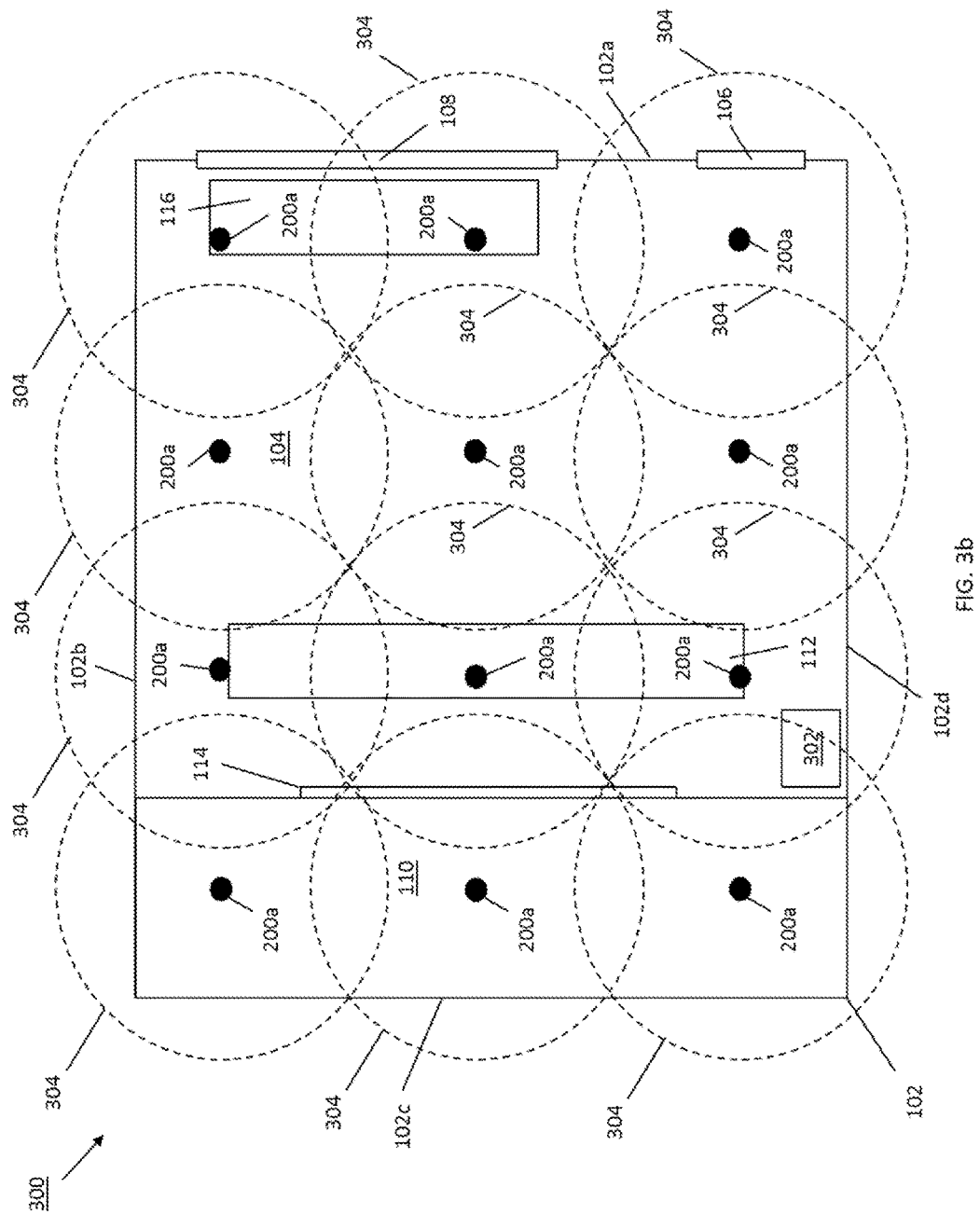
FIG. 3b is a schematic top view illustrating an embodiment of the customer selection determination system of FIG. 3a with the beacon devices providing communication areas.

Referring now to FIGS. 3a and 3b, an embodiment of a customer selection determination system 300 is illustrated. As illustrated in FIG. 3a, the customer selection determination system 300 may be provided by positioning a plurality of the beacon devices 200, discussed above with reference to FIG. 2, in and around the physical merchant location 100, discussed above with reference to FIG. 1. In the illustrated embodiment, a plurality of beacon devices 200a are positioned in and around the physical merchant location 100. As discussed above, the beacon devices 200 may be sized such that they may be inconspicuously positioned virtually anywhere in or around the physical merchant location 100. For example, the beacon devices 200a may be positioned on the ceiling of the physical merchant location 100, in the product display counter 112, and in the product display 116. Each of the beacon devices 200 in the customer selection determination system 300 may be configured to wirelessly communicate, via its first communications system 204, with a merchant network communication device 302 such as, for example, a Wifi wireless router connected to a network such as the Internet.

Referring now to FIG. 3b, in operation, each of the beacon devices 200 is configured to create a communication area 304 with its second communications system 208. For example, the second communications system 208 in each beacon device 200 may be BLE communications device that provides an approximately 100 foot radius communications area. However, other communications systems providing other communications areas are envisioned as falling within the scope of the present disclosure. As can be seen in the illustrated embodiment, the beacon devices 200 may be positioned in and around the physical merchant location 100 such that the communications areas 304 abut, overlap, or otherwise provide coverage for any area of interest within and around the physical merchant location 100. As such, one of skill in the art in possession of the present disclosure will appreciate that different configurations of the beacon devices 200 within and around the physical merchant location 100 may be selected to cover any area within and around the physical merchant location 100 with a communications area 304. As discussed in further detail below, each of the beacon devices 200 are configured to communicate with customer devices within their respective communications area 304 (e.g., using the second communication system 208) to collect data, and then send that data to the merchant network communication device 302 (e.g., using the first communication system 204) such that the data may be provided to a merchant device, a system provider device, and/or any other device operating to provide the merchant action recommendations discussed below. One of skill in the art will recognize that the use of BLE communication devices for communication between the beacon devices 200a and customer devices may be utilized to provide for low power communications in the background of a customer device (e.g., when the customer device is not being actively used by the customer.)

In the embodiments illustrated and discussed below, the beacon devices 200 and their communications areas 304 are not illustrated for clarity of illustration and discussed, but it should be understood that the communications and retrieval of information from beacon communication devices, and that provision of that information to a system provider device, may be accomplished using beacon devices providing communications areas such as the beacon devices 200 and communications areas 304 illustrated in FIGS. 3a and 3b. However, in some embodiments, the beacon devices 200a may be omitted from the customer selection determination system 300 and any communications between the customer devices and the system provider devices may be provided over other networks (e.g., Local Area Networks (LANs), the Internet, etc.) Thus, while a specific example of a customer selection determination system 300 is provided, one of skill in the art in possession of the present disclosure will recognize that a wide variety of different physical merchant locations may incorporate the beacon devices 200 or other communication systems in a variety of manners while remaining within its scope.

In the embodiments discussed below, the merchant action recommendation systems and methods involve a system provider using a system provider device to retrieve information collected by the beacon devices 200 from customer devices through a network (e.g., the Internet). In such embodiments, the system provider may associate the physical merchant location 100 (or its merchant), the beacon devices 200, merchant devices, and/or other components of the system with a physical merchant location account in a database located in a non-transitory memory. As such, information received from the beacon devices and merchant devices may be associated with the physical merchant location account in the database, and any results of the analysis of that information may be stored in associated with that physical merchant location account. In other embodiments, the system provider device may be a merchant device that is local to the physical merchant location 100 and that communicates with the beacon devices 200 using the merchant network communication device 302.

FIGS. 1, 3a, and 3b illustrate a physical merchant location 100 that is a single building, and the beacon devices 200 are positioned to provide communications areas 304 that cover the interior of that single building and an area outside the front of that single building. However, beacon devices 200 may be positioned virtually anywhere to retrieve information associated with a physical merchant location. For example, the physical merchant location may be located adjacent to or associated with a parking lot, and beacon devices may be positioned around that parking lot, at the entrances or exits of that parking lot, and/or anywhere else relative to that parking lot in order to collect and send information from beacon communication devices to the system provider device. In another example, the physical merchant location may be located in a mall, and beacon devices may be positioned around that mall, at the entrances or exits of that mall, and/or anywhere else relative to that mall in order to collect and send information from beacon communication devices to the system provider device. In some examples, the first communication system may be connected to Wifi networks available outside the physical merchant location in order to communicate collected information to a system provider device. In other examples, the first communication system may be a cellular communications system that allows the beacon devices to be positioned anywhere in range of a cellular communications tower, allowing beacon devices in the merchant to be positioned in virtually any physical location when providing the merchant action recommendation system.

Referring now to FIG. 4, an embodiment of a physical merchant location interior is illustrated that may be the physical merchant location interior 104 illustrated and discussed above with reference to FIGS. 3a and 3b. The physical merchant location interior includes the product display 116 that is located adjacent the exterior window 108 and that may include a plurality of products and/or product identifiers 402 and 404. A gesture capturing device 406 may be provided in or around the product display 116 such that it is positioned to capture gestures made by customers that are located opposite the exterior window 108 from the gesture capturing device 406, discussed below. In an embodiment, the gesture capturing device 406 may be a camera, a motion-capturing device, a three-dimensional object determination device, and/or a variety of other devices known in the art that will operate to capture the gestures of customers as discussed below. While an embodiment of a physical merchant location interior is illustrated and described, one of skill in the art in possession of the present disclosure will recognize that any of a wide variety of product displays known in the art will benefit from the teachings of the present and will thus fall within its scope.

Figure 5:
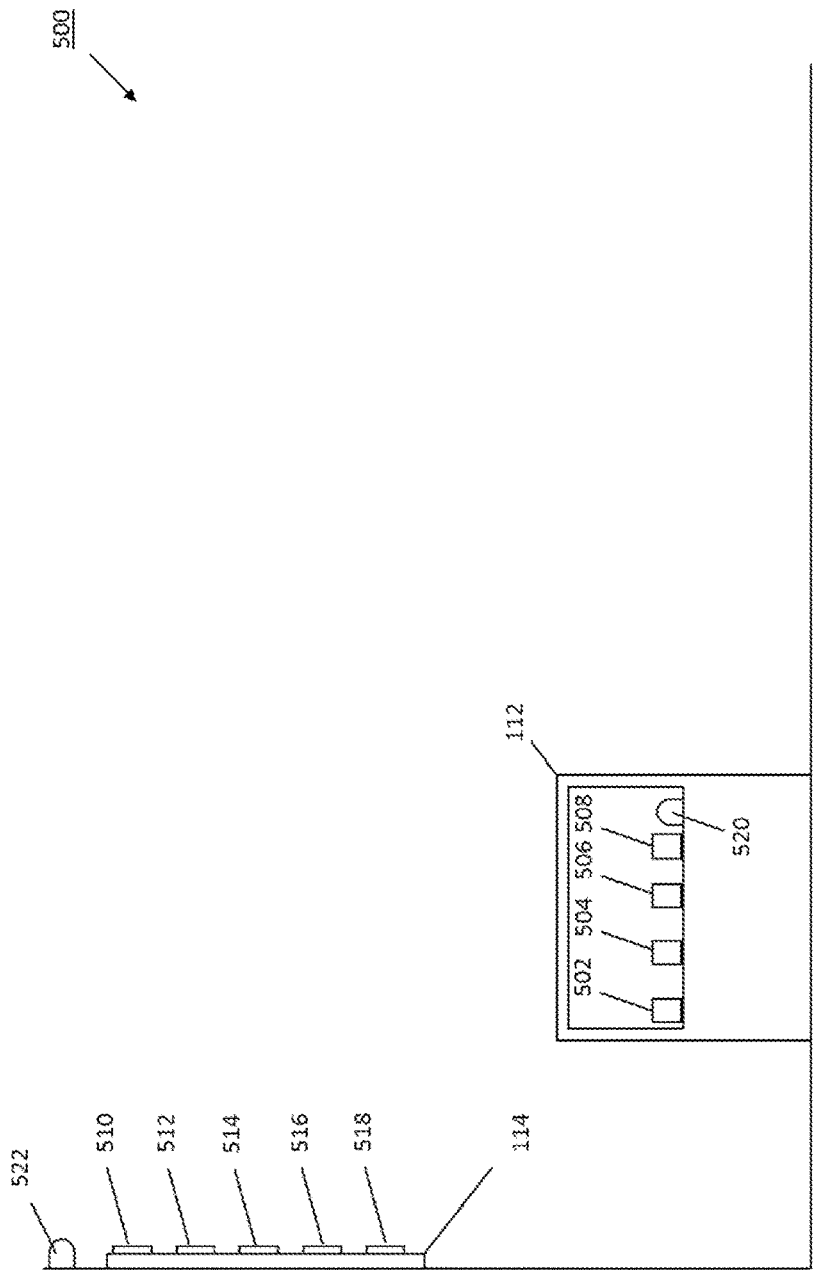
FIG. 5 is a schematic side view illustrating an embodiment of a portion of the physical merchant location of FIG. 1.

Referring now to FIG. 5, an embodiment of a physical merchant location interior 500 is illustrated that includes the product display counter 112 and the product indicator display 114 that are illustrated and discussed above with reference to FIGS. 3a and 3b. The product display counter 112 is provided in front of the product indicator display 114 and may include a plurality of products and/or product identifiers 502, 504, 506, and 508. The product indicator display 114 may additionally include a plurality of product indicators 510, 512, 514, 516, and 518. A gesture capturing device 520 may be provided in or around the product display counter 112 such that it is positioned to capture gestures made by customers that are located adjacent the product display counter 112, discussed below. In addition, a gesture capturing device 522 may be provided in or around the product indicator display 114 such that it is positioned to capture gestures made by customers that are located opposite the product display counter 112 from the product indicator display 114, discussed below. In an embodiment, the gesture capturing devices 520 and/or 522 may be cameras, motion-capturing devices, three-dimensional object determination devices, and/or a variety of other devices known in the art that will operate to capture the gestures of customers as discussed below. While a physical merchant location interior 500 is illustrated and described, one of skill in the art in possession of the present disclosure will recognize that any of a wide variety of product display counters and product indicator displays known in the art will benefit from the teachings of the present and will thus fall within its scope.

Referring now to FIG. 6, an embodiment of a method 600 for determining customer selections is illustrated. In an embodiment, the customer selection determination method 600 may be performed by a payment service provider such as, for example, PayPal Inc. of San Jose, Calif. that provides payment services for merchants and customers that allow transactions between those merchants and customers. As is known it the art, merchants may include merchant devices (e.g., computers) that are linked to a merchant account with the payment service provider, and customers may include customer devices (e.g., mobile phones) that are linked to a customer accounts with the payment service provider. In embodiments where the payment service provider provides the customer selection determination method 600, the merchant accounts and customer accounts may be used, for example, to identify merchants and customers. However, in other embodiments, the customer selection determination method 600 may be performed by the merchant and/or other system provider while remaining within the scope of the present disclosure. Thus, further references to a "system provider" are meant to include any combination of entities that operate to provide the customer selection determination system described herein and perform the customer selection determination method 600 discussed below.

The method 600 begins at block 602 where product locations for products in the physical merchant location are stored. In an embodiment, one or more storage devices including one or more databases may be used by the system provider device to store a plurality of product locations or product identifier locations for each of the products and product identifiers in the physical merchant location 100. For example, a merchant may provide the system provider device with the product location or product identifier locations corresponding to each of the products or product identifiers in the physical merchant location using, for example, software that allows the merchant to indicate the location of each product and product identifier in the physical merchant location in three dimensions. Such examples may include a system that allows a merchant to capture images, product identification information, and/or location information for each of the products in the physical merchant location 100 using a camera, a barcode scanning device, and/or other features of a mobile merchant device (e.g., a mobile phone) and associates the captured information with the layout of the physical merchant location 100 such that the relative location of each product or product identifier in the physical merchant location 100 is stored in the one or more databases. In another example, a location reporting device (e.g., merchant beacon communication devices that are configured to communicate with the beacon system discussed above with reference to FIGS. 3a and 3b) may be affixed to each product and product indicator in the physical merchant location, and then used to report the location of each of those products and product indicators in the physical merchant location 100 to the system provider device for storage in the one or more databases.

The method 600 may then proceed to block 604 where customer physical measurements are stored. In some embodiments of the method 600, customer physical measurements such as height, arm length, arm span, hand size, interocular distance, and/or a variety of other physical measurements of customers may be stored such that they are available for use in determining customer selections. For example, when the merchant is a clothing store, the merchant may have access to a history of clothing purchases of their customers, and may use clothing sizes to estimate physical measurements of customers. Similarly, a clothing store merchant may have previously had their customers provide their physical measurements or sizes and stored those physical measurements in a database. In some embodiments, a payment service provider may have access to a customer's purchase history, and may use previous purchases of clothing to estimate physical measurements of customers. Furthermore, a customer's participation in the customer selection determination system and method 600 may allow the system provider device to obtain, confirm, or adjust data on the physical measurements of that customer in order to refine a customer's physical measurements. As such, the customer selection determination system may "learn" a customer's physical measurements from previous customer selections that have been analyzed using the customer selection determination method 600. In some embodiments, a customer may simply provide any requested physical measurements through a customer interface on a system provider application or other customer device application that is used to access the customer selection determination system. While a few examples have been provided, one of skill in the art in possession of the present disclosure will recognize that physical measurements of customers may be collected, estimated, or otherwise determined in a variety of different manners and then be stored for later retrieval while remaining within the scope of the present disclosure.

The method 600 then proceeds to block 606 where customer information is received. As discussed in detail below, a wide variety of customer information may be received and/or retrieved by the system provider device at block 606 from one or more customer devices of the customer, from devices operated by the merchant, and/or from devices located in or around the physical merchant location. That customer information is used by the system provider device to determine a product in the physical merchant location that the customer is selecting. While a few examples are provided below, one of skill in the art in possession of the present disclosure will recognize that a wide variety of customer information capturing systems and methods will fall within the scope of the present disclosure.

Figure 7C:
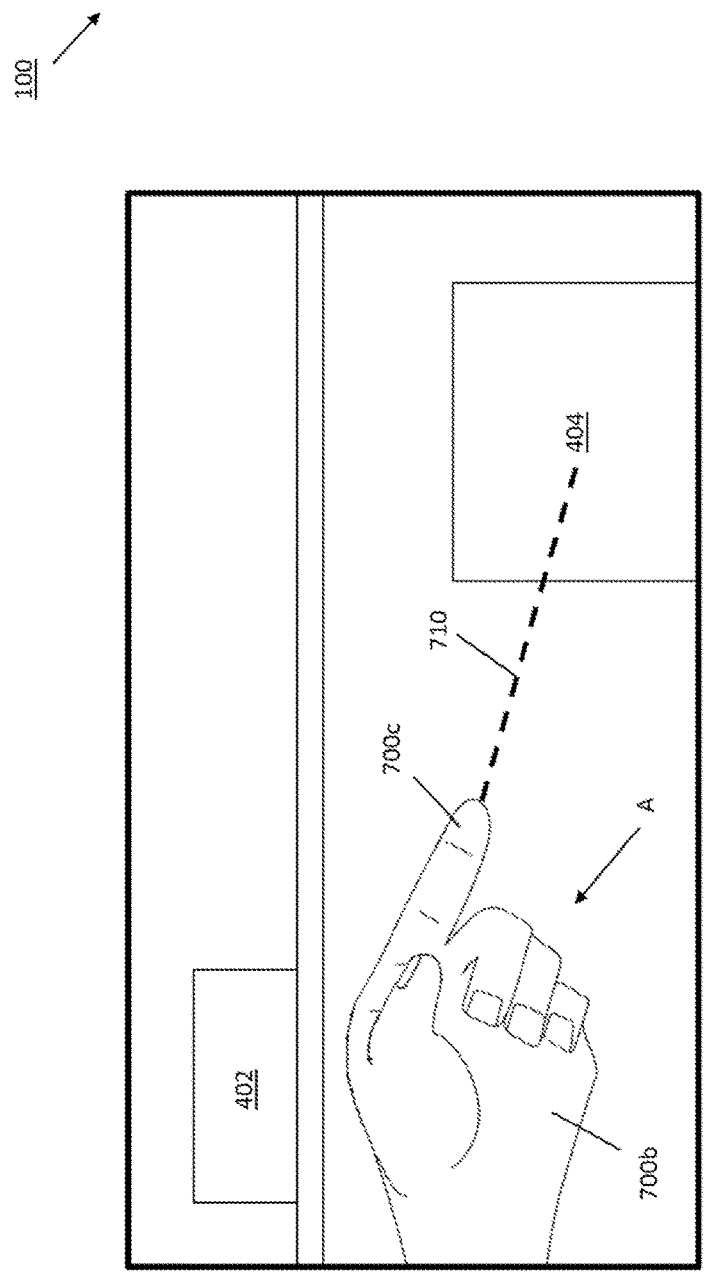
FIG. 7c is a wearable customer device view illustrating an embodiment of the customer of FIGS. 7a and 7b making the selection at the physical merchant location of FIG. 1.

Referring first to FIGS. 7a, 7b, and 7c, an example of a customer gesturing in front of the exterior window 108 of the physical merchant location 100 to make a selection of one of the product or product identifiers 402 or 404 that are located in the product display 116 is illustrated. In one example, customer information collected in the embodiment illustrated in FIGS. 7a, 7b, and 7c may be useful in determining customer "window shopping" selections in which a customer selects a product displayed through a window of the physical merchant location 100. In the embodiment illustrated in FIGS. 7a, 7b, and 7c, a customer 700 is positioned opposite the exterior window 108 from the product display 116 at the physical merchant location 100. The customer 700 may include a customer device such as, for example, mobile phone (not illustrated in FIGS. 7a, 7b, and 7c, but which may be located in a customer pocket or other customer storage location), along with wearable customer devices such as "smart" glasses 702 and a "smart" watch 704 (i.e., wearable customer devices that incorporate computing systems, communication systems, and/or other components that provide for "smart" information provision and retrieval as discussed below) illustrated in FIG. 7b. The customer 700 is illustrated in FIG. 7b as providing a selection gesture A by extending an arm 700a and a hand 700b to point at, indicate, or otherwise select one of the product or product identifiers 402 or 404 that are located in the product display 116 opposite the exterior window 108 from the customer 700. However, as discussed below, other selection gestures that include the customer looking or nodding at the product or product identifiers 402 or 404 are envisioned as falling within the scope of the present disclosure.

Referring next to FIGS. 8a and 8b, an example of a customer gesturing in front of the product display counter 112 of the physical merchant location 100 to make a selection of one of the product or product identifiers 502a, 502b, 502c, or 502d that are located in the product display counter 112 is illustrated. In one example, customer information collected in the embodiment illustrated in FIGS. 8a and 8b may be useful in determining customer selections in which a customer selects a product displayed in a display case at a physical merchant location. In the embodiment illustrated in FIGS. 8a and 8b, the customer 700 is positioned adjacent the product display counter 112 at the physical merchant location 100. The customer 700 includes the customer device such as, for example, the mobile phone (not illustrated in FIGS. 8a and 8b, but which may be located in a customer pocket or other customer storage location), along with the wearable customer devices such as the "smart" glasses 702 and the "smart" watch 704 (i.e., wearable customer devices that incorporate computing systems, communication systems, and/or other components that provide for "smart" information provision and retrieval as discussed below) illustrated in FIG. 8b. The customer 700 is illustrated in FIG. 8b as providing a selection gesture B by extending an arm 700a and a hand 700b to point at, indicate, or otherwise select one of the product or product identifiers 502a, 502b, 502c, or 502d that are located in the product display counter 112. However, as discussed below, other selection gestures that include the customer looking or nodding at the product or product identifiers 402 or 404 are envisioned as falling within the scope of the present disclosure.

Figure 9B:
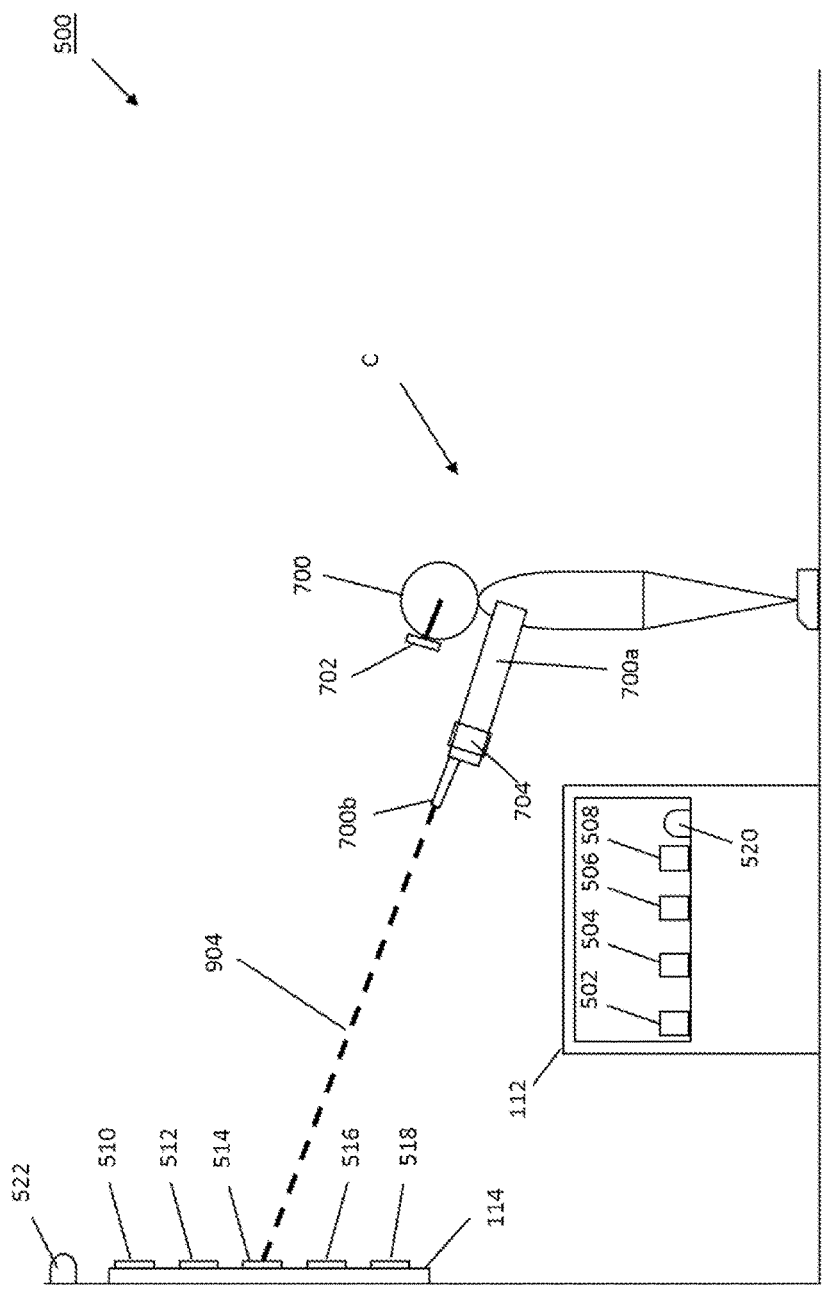
FIG. 9b is a schematic side view illustrating an embodiment of the customer of FIG. 9a making the selection at the physical merchant location of FIG. 1.

Referring next to FIGS. 9a and 9b, an example of a customer gesturing towards the product indicator display 114 in the physical merchant location 100 to make a selection of one of the product indicators 510, 512, 514, 516, and 518 on is illustrated. In one example, customer information collected in the embodiment illustrated in FIGS. 9a and 9b may be useful in determining customer selections in which a customer selects a product indicator displayed on a menu or advertisement at a physical merchant location. In the embodiment illustrated in FIGS. 9a and 9b, the customer 700 is positioned such that the product display counter 112 is located between the customer 700 and the product indicator display 114 at the physical merchant location 100. The customer 700 includes the customer device such as, for example, the mobile phone (not illustrated in FIGS. 9a and 9b, but which may be located in a customer pocket or other customer storage location), along with the wearable customer devices such as the "smart" glasses 702 and the "smart" watch 704 (i.e., wearable customer devices that incorporate computing systems, communication systems, and/or other components that provide for "smart" information provision and retrieval as discussed below) illustrated in FIG. 9b. The customer 700 is illustrated in FIG. 9b as providing a selection gesture C by extending an arm 700a and a hand 700b to point at, indicate, or otherwise select one of the product indicators 510, 512, 514, 516, and 518 that are located in the product indicator display 114. However, as discussed below, other selection gestures that include the customer looking or nodding at the product or product identifiers 402 or 404 are envisioned as falling within the scope of the present disclosure.

At block 606, the customer device and/or the wearable device(s) may provide customer information to the system provider device through one or more of the beacon device 200a. For example, a customer device such as a mobile phone, or wearable customer devices such as the smart glasses 702 or smart watch 704, may include BLE communication systems that are configured to communicate with beacon devices 200a. In some embodiments, the BLE communications between the customer device/wearable customer device(s) and the beacon devices may be authorized by a customer 700 once (e.g., by selecting to allow such communication upon a first connection) such that subsequent visits by the customer 700 to the physical merchant location 100 result in automatic BLE communications without interaction from the customer 700. As such, a customer may be recognized and their customer information provided to the system provider device from the customer device or wearable customer devices without any interaction from the customer 700 (e.g., other than the customer 700 entering the beacon communication areas 304 in the physical merchant location 100). However, other methods of communication between the beacon devices and the customer device/wearable customer device(s) (e.g., that are customer-authorized each time) are envisioned as falling within the scope of the present disclosure. Furthermore, in some embodiments, the customer device/wearable customer device(s) may communicate with the system provider device without using the beacon devices 200a. For example, the customer device/wearable customer device(s) may be configured to communicate with the system provider device over any other communications networks (e.g., a Local Area Network (LAN) available at the physical merchant location 100, the Internet, etc.) while remaining within the scope of the present disclosure.

In one embodiment, the customer device/wearable customer device(s) may communicate a customer location to the system provider device at block 606. For example, any or all of the customer device/wearable customer device(s) may use a location determination device (e.g., a Global Positioning System (GPS) device) in that customer device/wearable customer device(s) to communicate customer location coordinates (e.g., GPS coordinates) to the system provider device. In another embodiment, communication between the customer device/wearable customer device(s) and the beacon devices 200a may allow the beacon devices to use communication-based location-determination techniques (e.g., triangulation techniques) to determine a customer location of the customer device/wearable customer device(s) and communicate that customer location to the system provider device. In another embodiment, the gesture capturing devices 406, 520, and/or 522 may be used to determine (or verify) a customer location of the customer 700. For example, the positioning of the gesture capturing devices 406, 520, and/or 522 may be stored in the system provider device, and images captured or determined by the gesture capturing devices 406, 520, and/or 522 may be analyzed to determine (or verify) a customer location of the customer 700 relative to the physical merchant location 100. In embodiments where multiple customer devices of a customer, as well as one or more merchant devices such as the gesture capturing devices 406, 520, and/or 522, communicate a customer location to the system provider device, the system provider device may increase the accuracy of customer location determinations by using the multiple customer locations received at block 606 to estimate a likeliest customer location of the customer 700. While a few examples have been provided, one of skill in the art in possession of the present disclosure will recognize that a customer location of the customer may be retrieved and/or determined by the system provider device in a variety of manners while remaining within the scope of the present disclosure.

In one embodiment, the customer device/wearable customer device(s) may communicate a customer orientation to the system provider device at block 606. For example, any or all of the customer device/wearable customer device(s) may use an orientation determination device (e.g., a gyroscope device, an accelerometer device, etc.) in that customer device/wearable customer device(s) to communicate customer orientation information to the system provider device. In another embodiment, communication between the customer device/wearable customer device(s) and the beacon devices 200*a* may allow the beacon devices to use communication-based orientation-determination techniques to determine a customer orientation of the customer device/wearable customer device(s) and communicate that customer orientation to the system provider device. In another embodiment, the gesture capturing devices 406, 520, and/or 522 may be used to determine (or verify) a customer orientation of the customer 700. For example, the positioning of the gesture capturing devices 406, 520, and/or 522 may be stored in the system provider device, and images captured or determined by the gesture capturing devices 406, 520, and/or 522 may be used to determine (or verify) a customer orientation of the customer 700 relative to the physical merchant location 100. In embodiments where multiple customer devices of a customer, as well as one or more merchant device such as the gesture capturing devices 406, 520, and/or 522, communicate a customer orientation to the system provider device, the system provider device may increase the accuracy of customer orientation determinations by using the multiple customer orientations received to estimate a likeliest customer orientation of the customer 700. While a few examples have been provided, one of skill in the art in possession of the present disclosure will recognize that a customer orientation of the customer may be retrieved and/or determined by the system provider device in a variety of manners while remaining within the scope of the present disclosure.

At block 606, the customer device/wearable customer device(s) may also communicate customer selection indication data to the system provider device at block 606. In one embodiment, any plurality of the customer device/wearable customer device(s) may be configured to communicate with each other to determine customer selection indication data and send that customer selection indication data to the system provider device. For example, either or both of the customer device (e.g., a mobile phone) and the smart glasses 702 may be configured to communicate with the smart watch 704 to determine customer selection indication data by determining their relative locations in order to estimate the positioning of the arm 700*a* and hand 700*b* of the customer 700 in the selection gestures A, B, and C provided by the customer 700 as illustrated in FIGS. 7*b*, 8*b*, and 9*b*. In those examples, with the smart watch 704 is located on the end of the customer's arm 700*a* and near their hand 700*b*, a determination of the relative position of the smart watch 704 and the customer device (e.g., mobile phone) and/or smart glasses 702 may be used to allow the estimate of the elevation of the arm 700*a*, the direction of the hand 700*b* of the customer 700, and/or other characteristics of the selections gestures A, B, and C. In embodiments, those estimations may be cross-referenced with a database of arm and hand information (e.g., range of motion information, common arm/hand positioning, etc.) such that the relative positioning of the smart watch 704 and customer device (e.g., mobile phone) and/or smart glasses 702 provides a more accurate estimate of the positioning of the arm 700*a* and hand 700*b* of the customer 700 in the selection gestures A, B, and C provided by the customer 700.

In another example, the smart glasses 702 may be configured to determine customer selection indication data by capturing an image of the arm 700*a* and/or hand 700*b* of the customer 700, as illustrated in FIG. 7*c*. As is known in the art, smart glasses may include a camera or other image capturing device that is configured to capture images and/or video of anything in the view of the customer 700, and images captured by the smart glasses 702 (e.g., the wearable device view illustrated in FIG. 7*c*) may be analyzed by the smart glasses 702 (or the customer device or system provider device) to determine customer selection indication data details about the customer's arm 700*a* and hand 700*b* that indicate of the elevation of the arm 700*a*, the direction of the hand 700*b* of the customer 700, and/or other characteristics of the selections gestures A, B, and C. For example, in FIG. 7*c*, the hand 700*b* of the customer 700 is captured in an image by the smart glasses 702, and that image includes an extended finger 700*c* on the hand 700*b* as well as a particular hand orientation that may be provided to the system provider device as customer selection indication data. While the use of images captured by the smart glasses 702 are only illustrated and described with regard to the embodiment illustrated in FIG. 7*b*, one of skill in the art in possession of the present disclosure will recognize that similar images may be captured and used in the same manner with regard to the embodiments illustrated in FIGS. 8*a*/8*b* or 9*a*/9*b* while remaining within the scope of the present disclosure.

In another example, the gesture capturing devices 406, 520, and/or 522 may be configured to determine customer selection indication data by capturing an image or detecting the positioning of the arm 700*a*, hand 700*b*, and/or other features of the customer 700 used in the selection gestures A, B, and C. As such, the gesture capturing devices 406, 520, and 522 provide for the capture of customer selection indication data without the need to communicate with the customer device/wearable customer devices on the customer 700. Standard images and/or depth images captured by the gesture capturing devices 406, 520, and/or 522 may be provided to the system provider device and analyzed by the system provider device as discussed below to determine customer selection indication details about the customer's arm 700*a* and hand 700*b* that indicate of the elevation of the arm 700*a*, the direction of the hand 700*b*, and/or other characteristics of the selections gestures A, B, and C of the customer 700. Furthermore, other details about the customer may be captured such as, for example, whether the customer is standing, sitting, kneeling, crouching, and/or any other characteristic of the customer 700 that operates to provide the selection gestures A, B, and C. As such, the height of the customer gesture (e.g., the height of the customer arm when they are pointing at a product, the height of a customer's eyes when they are looking at or nodding towards a product, etc.) may be provided as customer selection indication data at block 606.

In an embodiment, at block 606 the system provider device may retrieve customer information that that includes the customer physical measurements stored at block 604. For example, the system provider device may utilize the communications between itself and the customer device and/or customer wearable devices to determine an customer identity of the customer (e.g., via a customer account number associated with a customer phone number of the customer device), and then use that customer identity to retrieve the customer physical measurements of the customer 700 that were stored at block 604.

Thus, the customer selection determination system operates to retrieve a wide variety of information about the customer at block 606 that may include any physical characteristics of the customer, any data about a selection gesture currently being made by the customer 700, historical selection data associated with that customer, and/or any other data that one of skill in the art in possession of the present disclosure will recognize would be helpful in determining a particular location within the physical merchant location 100 that the customer 700 is gesturing towards. For example, customer purchase histories may be received/retrieved by the system provider device at block 606 that include previous product purchases that may then be used to determine between multiple products a customer may be selecting (e.g., based on customer preferences extracted from those purchase histories). Furthermore, rather than (or in addition to) being used for determining arm and hand positioning, the gesture capturing devices 406, 520, and/or 522 may be configured to track a customer's eyes to determine a direction the customer is looking in, analyze video to determine motions that are part of the selection gestures A, B, and C, etc. In some embodiments, multiple customers may provide the customer information that may then be used to determine which of a plurality of products and/or product identifiers that a customer is selecting (e.g., a primary customer's selection of a product may be verified by a secondary customers reaction or physical gestures made in response to that selection). Thus, while a few specific examples of a customer pointing at a product or product identifier are described and illustrated herein, the systems and methods of the present disclosure are envisioned as extending to detecting other gestures (e.g., a customer looking at a product, "nodding" towards a product, etc.) using a variety of systems known in the art in order to determine what customers are attempting to select.

The method 600 then proceeds to block 608 where the customer information is analyzed to determine a product location in the physical merchant location 100 that the customer 700 is selecting. In an embodiment, the system provider device analyzes the customer information received at block 606 and the product locations stored at block 602 to determine a product location that the customer is selecting. At block 608, the system provider device may analyze any or all of the customer information received at block 606 in order to determine one of the plurality of product locations in the physical merchant location 100 that the customer 700 is pointing at, gesturing towards, or otherwise selecting. Thus, different pieces and types of the customer information analyzed as discussed in the examples below may be used while remaining within the scope of the present disclosure.

Referring first to FIGS. 7a, 7b, and 7c, at block 608 the system provider device may analyze a customer location (indicated by the customer location indicator 706 illustrated in FIG. 7a) that was received at block 606, a customer orientation (indicated by the customer orientation indicator 708 illustrated in FIG. 7a) that was received at block 606, customer selection indication data that includes the details about the characteristics of the selection gesture A illustrated in FIGS. 7b and 7c and discussed above, customer physical measurement information or estimates that may include the height, arm length, arm span, interocular distance, and/or other physical characteristics of the customer, historical customer selection data, and/or any of the other information discussed herein. That analysis may indicate to the system provider device that the customer 700 is positioned adjacent the exterior window 108 of the physical merchant location 100, is facing the product or product identifier 404, and is looking and pointing towards a product location that is indicated by the customer selection data analysis line 710 in FIGS. 7b and 7c.

Referring next to FIGS. 8a and 8b, at block 608 the system provider device may analyze a customer location (indicated by the customer location indicator 800 illustrated in FIG. 8a) that was received at block 606, a customer orientation (indicated by the customer orientation indicator 802 illustrated in FIG. 8a) that was received at block 606, customer selection indication data that includes the details about the characteristics of the selection gesture B illustrated in FIG. 8b and discussed above, customer physical measurement information that may include the height, arm length, arm span, interocular distance, and/or other physical characteristics of the customer, historical customer selection data, and/or any of the other information discussed herein. That analysis may indicate to the system provider device that the customer 700 is positioned adjacent the product display counter 112 in the physical merchant location 100, is facing the product or product identifier 504, and is looking and pointing towards a product location that is indicated by the customer selection data analysis line 804 in FIG. 8b.

Referring next to FIGS. 9a and 9b, at block 608 the system provider device may analyze a customer location (indicated by the customer location indicator 900 illustrated in FIG. 9a) that was received at block 606, a customer orientation (indicated by the customer orientation indicator 902 illustrated in FIG. 9a) that was received at block 606, customer selection indication data that includes the details about the characteristics of the selection gesture C illustrated in FIG. 9b and discussed above, customer physical measurement information that may include the height, arm length, arm span, interocular distance, and/or other physical characteristics of the customer, historical customer selection data, and/or any of the other information discussed above. That analysis may indicate to the system provider device that the customer 700 is positioned adjacent the product display counter 112 in the physical merchant location 100, is facing the product indicator display 114, and is looking and pointing towards a product location that is indicated by the customer selection data analysis line 904 in FIG. 9b.

In some embodiments, e.g., depending on the amount of customer information available, the analysis at block 608 may determine a product location range that the customer is selecting. One of skill in the art will recognize that a product location range determined using the analysis discussed above may be narrowed as more information is available to the system provider device.

The method 600 then proceeds to block 610 where a product is determined to be associated with the product location that was determined at block 608. In an embodiment, the system provider device accesses the database that includes the stored product locations for the plurality of products in the merchant physical location 100, and determines which of those plurality of products the product location determined at block 608 is associated with the product location determined at block 608. For example, the customer selection data analysis line 710 determined by the system provider device and illustrated in FIGS. 7b and 7c may result in a product location that corresponded to the product or product identifier 404 illustrated in FIGS. 7a, 7b, and 7c. Similarly, the customer selection data analysis line 804 determined by the system provider device and illustrated in FIG. 8b may result in a product location that corresponded to the product or product identifier 504 illustrated in FIGS. 8a and 8b. Similarly, the customer selection data analysis line 904 determined by the system provider device and illustrated in FIG. 9b in FIG. 9b may result in a product location that corresponded to the product indicator 514 illustrated in FIG. 9b. In situations where a product location range is associated with more than one product in the physical merchant location 100, any of the plurality of products associated with that product location range may be determined at block 610. As discussed above, customer purchase histories and previous selection data may be analyzed to eliminate some of those plurality of products associated with the product location range such as, for example, when the system provider device can determine that a product in the product location range is not a likely product that would be selected by the customer 700.

Thus, the systems and methods of the present disclosure allow for the determination of products, product identifiers, and/or any other element in a physical merchant location that a customer is pointing at, gesturing towards, or otherwise physically selecting when that customer is physically separated from that element. As discussed below, the systems and methods may be leveraged to provide a variety of information to the merchant and/or customer about the customer-selected product and/or product identifier, and also may be used to streamline current systems and methods that are bottlenecked at the point of determining what a customer is trying to select in a physical merchant location.

Figure 10:
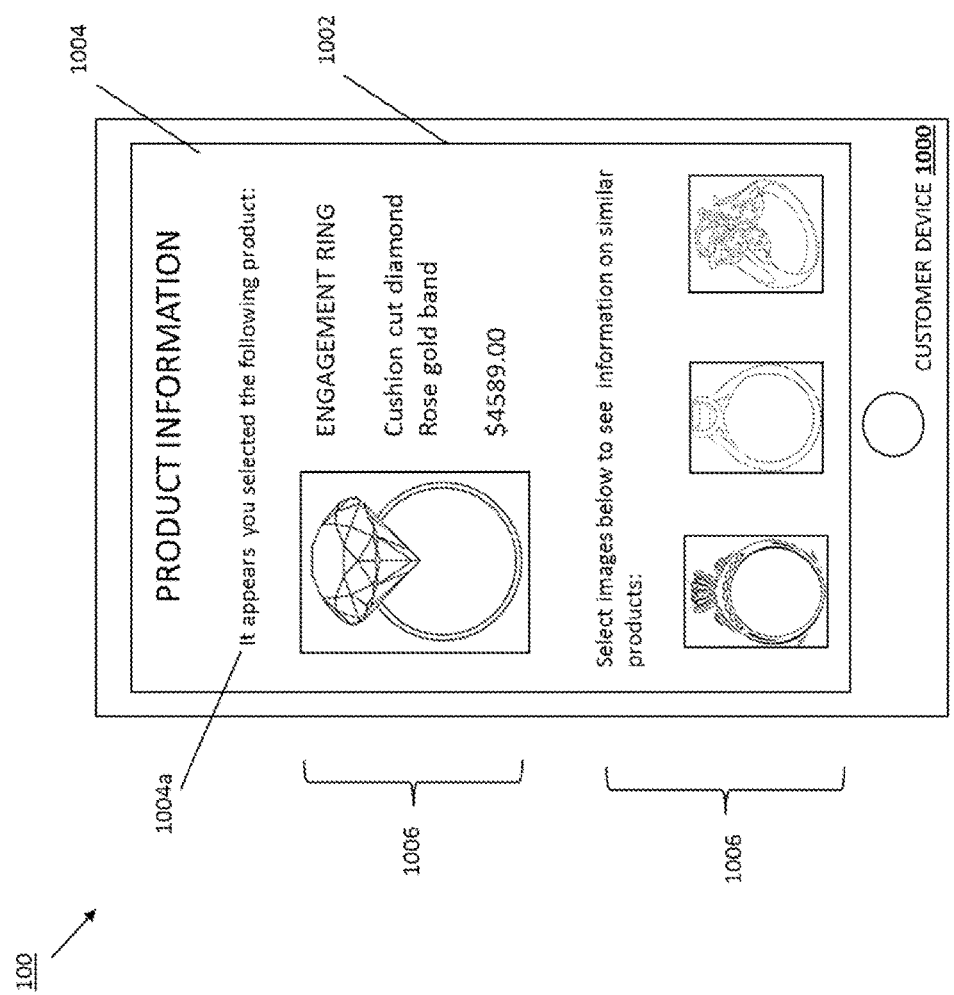
FIG. 10 is a front view illustrating an embodiment of a customer device displaying a product information screen.

Referring first to FIG. 10, a customer device 1000 is illustrated that includes a display 1002 displaying a product information screen 1004 that may be provided to the customer device 1000 following the determination of the product at block 610. The product information screen 1004 includes an indication 1004a to the customer 700 that they have been detected selecting a product, and a product information section 1006 that includes an image of the customer-selected product and details of the customer selected-product (e.g., product type, specific product characteristics, product price, etc.) The product information screen 1004 also includes a similar products section 1008 that includes image-links to a plurality of products that are similar to the customer-selected product, and that may be selected by the customer to view product details about those similar products. In embodiments where several products are determined to be associated with the product location range at block 610, each of those products may be provided similarly as illustrated for the similar products in the similar products section 1008, and the customer may be allowed to select which of those products they would like more information on (e.g., by selecting an image of the desired product). While a few examples of product information about a customer-selected product have been provided, one of skill in the art will recognize that any type of product information related to the customer-selected product (e.g., inventory information) may be provided on the product information screen 1004 while remaining within the scope of the present disclosure. Furthermore, while the product information for the customer-selected product is illustrated as being provided on a customer device that is a mobile phone or tablet, the product information may be provided on other devices (e.g., the wearable customer devices such as the smart glasses 702 and/or the smart watch 704 discussed above) while remaining within the scope of the present disclosure. Thus, a customer may point towards, gesture at, or otherwise physically indicate a selection a product or product indicator at a physical merchant location in order to be provided product information on one or more of their customer devices.

Similarly as discussed with reference to FIG. 10, a merchant device of the merchant may display a product information screen that is substantially similar to the product information screen 1004 displayed on the customer device 1000. In embodiments where the merchant includes smart glasses (e.g., similar to the smart glasses 702 discussed above), the merchant may have the product information for the customer-selected product provided on their smart glasses while they are helping the customer. The use of such product information screens on merchant devices in the systems and methods of the present disclosure allow a merchant to quickly and easily determine which of a plurality of products a customer is selecting, and provide the merchant information about those products that is useful in helping the customer make a purchasing decision. In some embodiments, the merchant device may communicate with the customer device of the customer that is selecting a product or product indicator in order to ensure that the merchant device displays a product information screen for a product that that customer is selecting. In a specific example, such a merchant device may display a product information screen for a product that is selected by the customer with a customer device that is closest to the merchant device. Thus, a customer may point towards, gesture at, or otherwise physically indicate a selection a product or product indicator at a physical merchant location and, in response, the merchant selling that product may be provided product information about that product on their merchant device.

Figure 11:
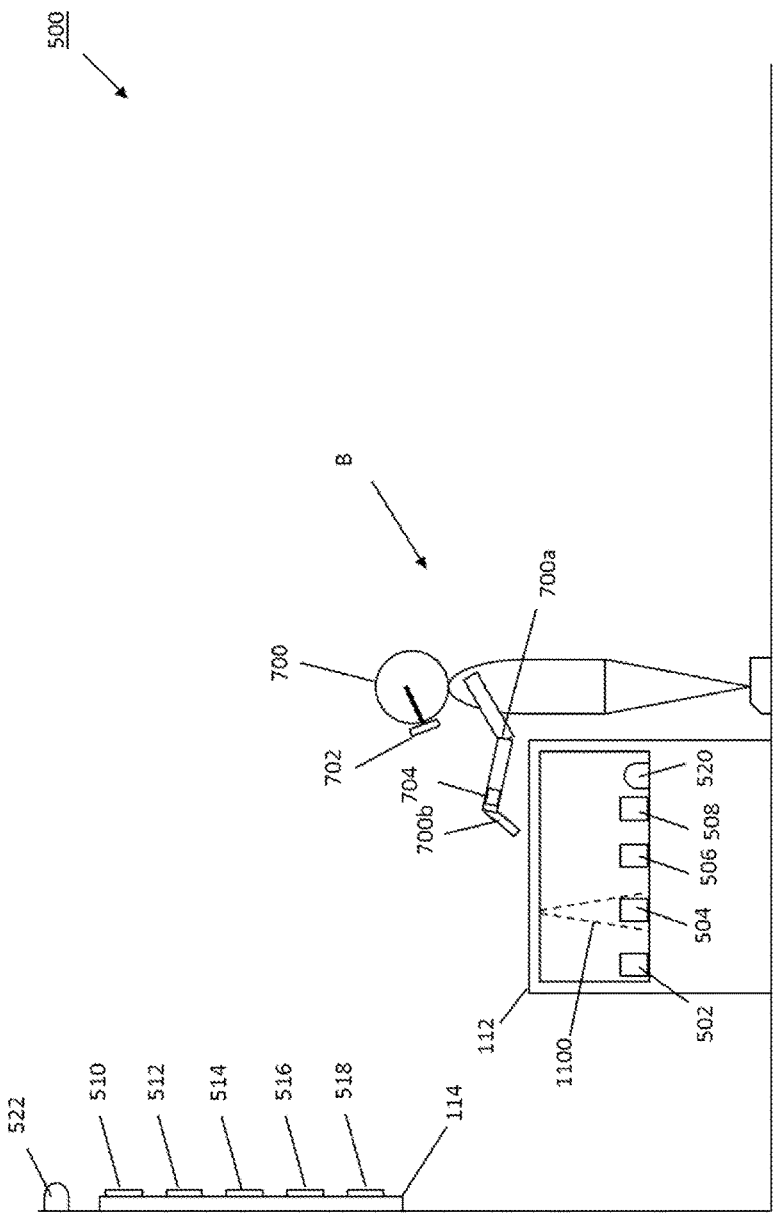
FIG. 11 is a schematic side view illustrating an embodiment of a customer making a selection at the physical merchant location of FIG. 1 and, in response, a visual indication of the selected product being provided.
Figure 12:
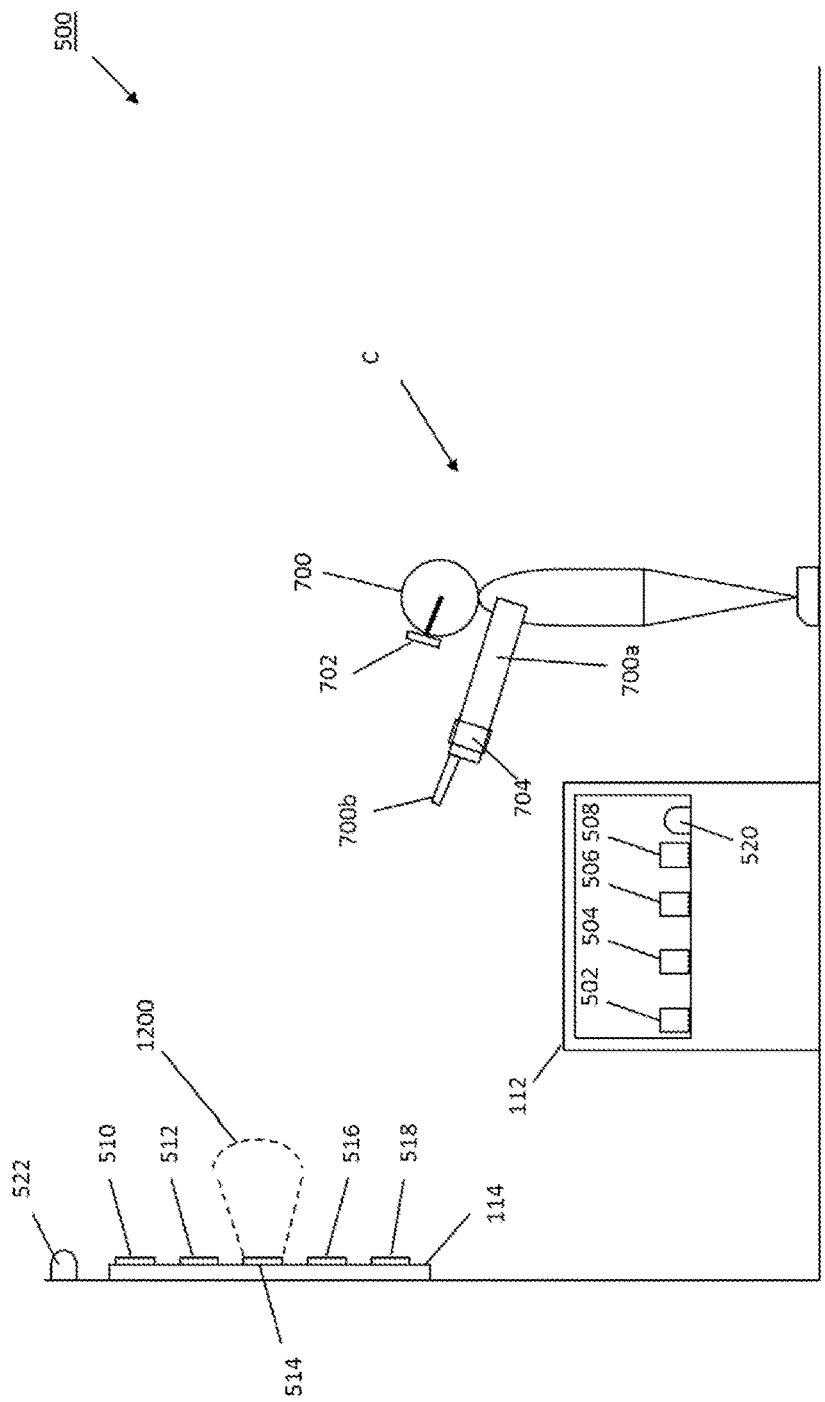
FIG. 12 is a schematic side view illustrating an embodiment of a customer making a selection at the physical merchant location of FIG. 1 and, in response, a visual indication of the selected product being provided.

In some embodiments, the determination of the product at block 610 may result in the system provider device sending a signal to a product indicator device in the physical merchant location that causes the product indicator device to provide a visual or physical indication of the customer-selected product. For example, referring to FIG. 11, a product indicator device (not illustrated, but located in the product display counter 112) may include a lighting device, and following the determination at block 610 that the customer 700 is selecting the product or product identifier 504, the system provider device may send a signal to the lighting device that results in a lighting indication 1100 on the product or product identifier 504, as illustrated. In embodiments where the merchant include smart glasses, the product may be indicated in the view of the merchant wearing the smart glasses (e.g., a smart glasses screen between the merchant and the customer-selected product may indicate to the merchant in their field of view which product has been selected.) In another example, referring to FIG. 12, a product indicators on the product indicator display 114 may include product indicator devices such as lighting devices, and following the determination at block 610 that the customer 700 is selecting the product indicator 514, the system provider device may send a signal to the lighting device in the product indicator 514 that results in a lighting indication 1200 from the product indicator 514, as illustrated. In embodiments where the merchant includes smart glasses, the product indicator 514 may be indicated in the view of the merchant wearing the smart glasses (e.g., a smart glass screen between the merchant and the customer-selected product may indicate to the merchant in their field of view which product indicator has been selected.) While lighting indications have been illustrated and described, other physical indications such as physically moving the product (e.g., causing the product to raise up on a moveable platform, rotate on a rotatable platform, etc.) are envisioned as falling within the scope of the present disclosure. Thus, a customer may point towards, gesture at, or otherwise physically indicate a selection of a product or product indicator at a physical merchant location and, in response, a physical indication such as the lighting up or moving of that product will be provided to indicate which of the products the customer has selected.

In some embodiments, the customer selection determination system may learn customer selection details about customers that make selections for use in subsequent customer product selections. For example, subsequent product selections by a customer may benefit from previous product selections that allow the system provider device to determine how a customer typically points at products, in which direction a customer typically points at a product from, to determined or refine customer physical measurements, and/or a variety of other product selection characteristics known in the art.

In some embodiments, the customer selection of products described herein may be utilized in a product ordering and payment system that allows a customer to select and pay for products from a merchant without the need to interact with the merchant. For example, the customer device may include a product ordering application that connects to the system provider device through the beacon devices discussed above. The customer may launch the product ordering application in order to create a product ordering list, and then select products for product ordering list using the customer selection determination method discussed above (e.g., following the determination of a customer-selected product at block 610, that product may be placed on the product ordering list). In an example, each selection may be indicated to the user similarly to that illustrated in FIG. 10, and the customer may confirm any selections made to build a list of products that the customer would like to order. Following completion of the product ordering list, the system provider device may allow the customer to pay for the products on the product ordering list, and once the customer has made that payment, the product ordering list may be converted to a product purchasing list that is then forwarded to the merchant device so that the merchant may provide the products to the customer. In situations where the merchant provides inventory numbers for the products available for purchase, the product selection and ordering system may be used to update those inventory numbers, and inform other customers when inventory of any of the products is getting low or has run out.

Figure 13:
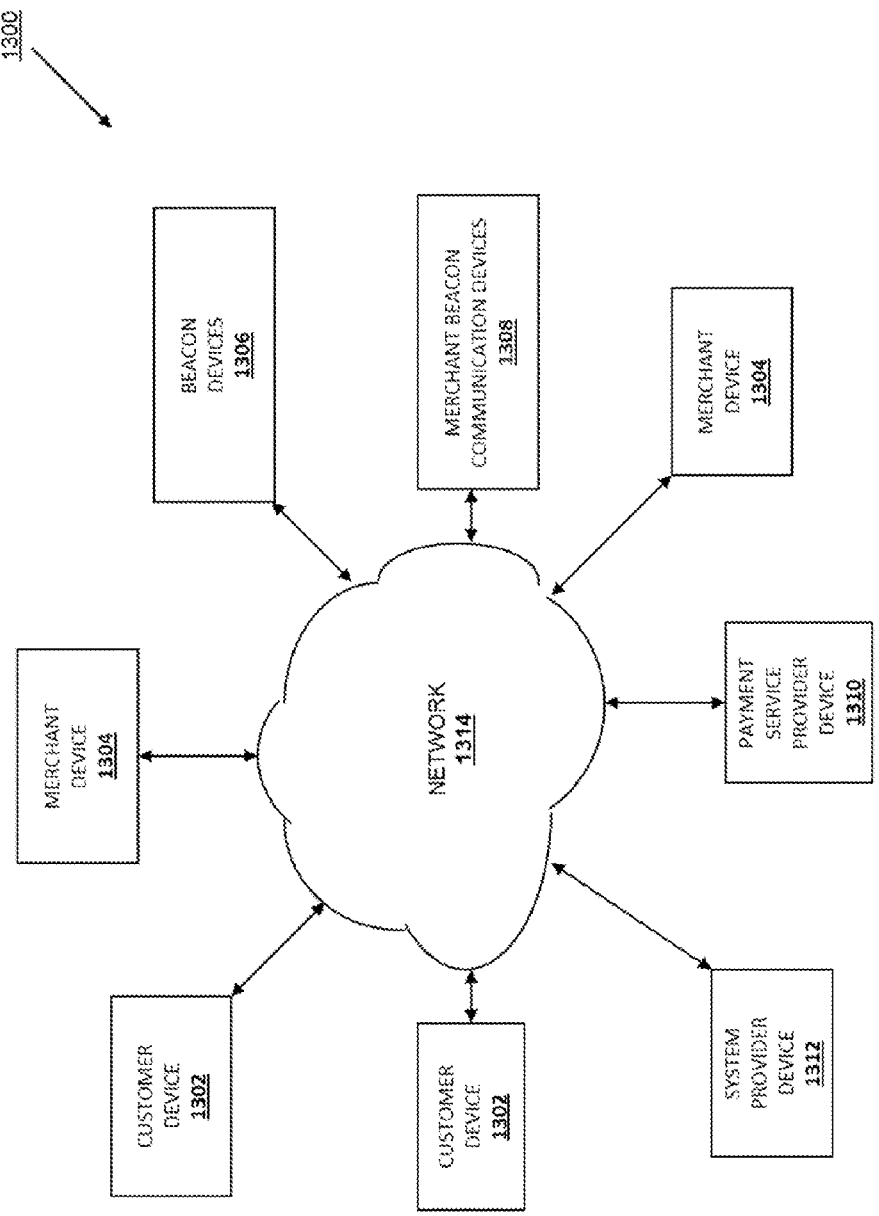
FIG. 13 is a schematic view illustrating an embodiment of a networked system.

Referring now to FIG. 13, an embodiment of a network-based system 1300 for implementing one or more processes described herein is illustrated. As shown, the network-based system 1300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 13 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1300 illustrated in FIG. 13 includes a plurality of customer devices 1302, a plurality of merchant devices 1304, a plurality of beacon devices 1306, a plurality of merchant beacon communication devices 1308, a payment service provider device 1310, and/or a system provider device 1312 in communication over one or more networks 1314. The customer devices 1302 may be the customer devices discussed above and may be operated by the customers discussed above. The merchant devices 1304, beacon devices 1306, and merchant beacon communication devices 1308 may be the merchant devices, beacon devices, and merchant beacon communication devices discussed above and may be operated by the merchants discussed above. The payment service provider device 1310 may be the payment service provider devices discussed above and may be operated by a payment service provider such as, for example, PayPal Inc. of San Jose, Calif. The system provider devices 1312 may be the system provider devices discussed above and may be operated by the system providers discussed above.

The customer devices 1302, merchant devices 1304, beacon devices 1306, merchant beacon communication devices 1308, payment service provider device 1310, and/or system provider device 1312 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1300, and/or accessible over the network 1314.

The network 1314 may be implemented as a single network or a combination of multiple networks. For example, in various embodiments, the network 1314 may include the Internet and/or one or more intranets, landline networks, wireless networks, and/or other appropriate types of networks.

The customer devices 1302 may be implemented using any appropriate combination of hardware and/or software configured for wired and/or wireless communication over network 1314. For example, in one embodiment, the customer devices 1302 may be implemented as a personal computer of a customer in communication with the Internet. In other embodiments, the customer devices 1302 may be a smart phone, personal digital assistant (PDA), laptop computer, and/or other types of computing devices.

The customer devices 1302 may include one or more browser applications which may be used, for example, to provide a convenient interface to permit the customer to browse information available over the network 1314. For example, in one embodiment, the browser application may be implemented as a web browser configured to view information available over the Internet.

The customer devices 1302 may also include one or more toolbar applications which may be used, for example, to provide customer-side processing for performing desired tasks in response to operations selected by the customer. In one embodiment, the toolbar application may display a customer interface in connection with the browser application.

The customer devices 1302 may further include other applications as may be desired in particular embodiments to provide desired features to the customer devices 1302. In particular, the other applications may include a payment application for payments assisted by a payment service provider through the payment service provider device 1310. The other applications may also include security applications for implementing customer-side security features, programmatic customer applications for interfacing with appropriate application programming interfaces (APIs) over the network 1314, or other types of applications. Email and/or text applications may also be included, which allow customer payer to send and receive emails and/or text messages through the network 1314. The customer devices 1302 includes one or more customer and/or device identifiers which may be implemented, for example, as operating system registry entries, cookies associated with the browser application, identifiers associated with hardware of the customer devices 1302, or other appropriate identifiers, such as a phone number. In one embodiment, the customer identifier may be used by the payment service provider device 1310 to associate the customer with a particular account as further described herein.

The merchant devices 1304 may be maintained, for example, by a conventional or on-line merchant, conventional or digital goods seller, individual seller, and/or application developer offering various products and/or services in exchange for payment to be received conventionally or over the network 1314. In this regard, the merchant devices 1304 may include a database identifying available products and/or services (e.g., collectively referred to as items) which may be made available for viewing and purchase by the customer.

The merchant devices 1304 also include a checkout application which may be configured to facilitate the purchase by the payer of items. The checkout application may be configured to accept payment information from the customer through the customer devices 1302 and/or from the payment service provider through the payment service provider device 1310 over the network 1314.

Figure 14:
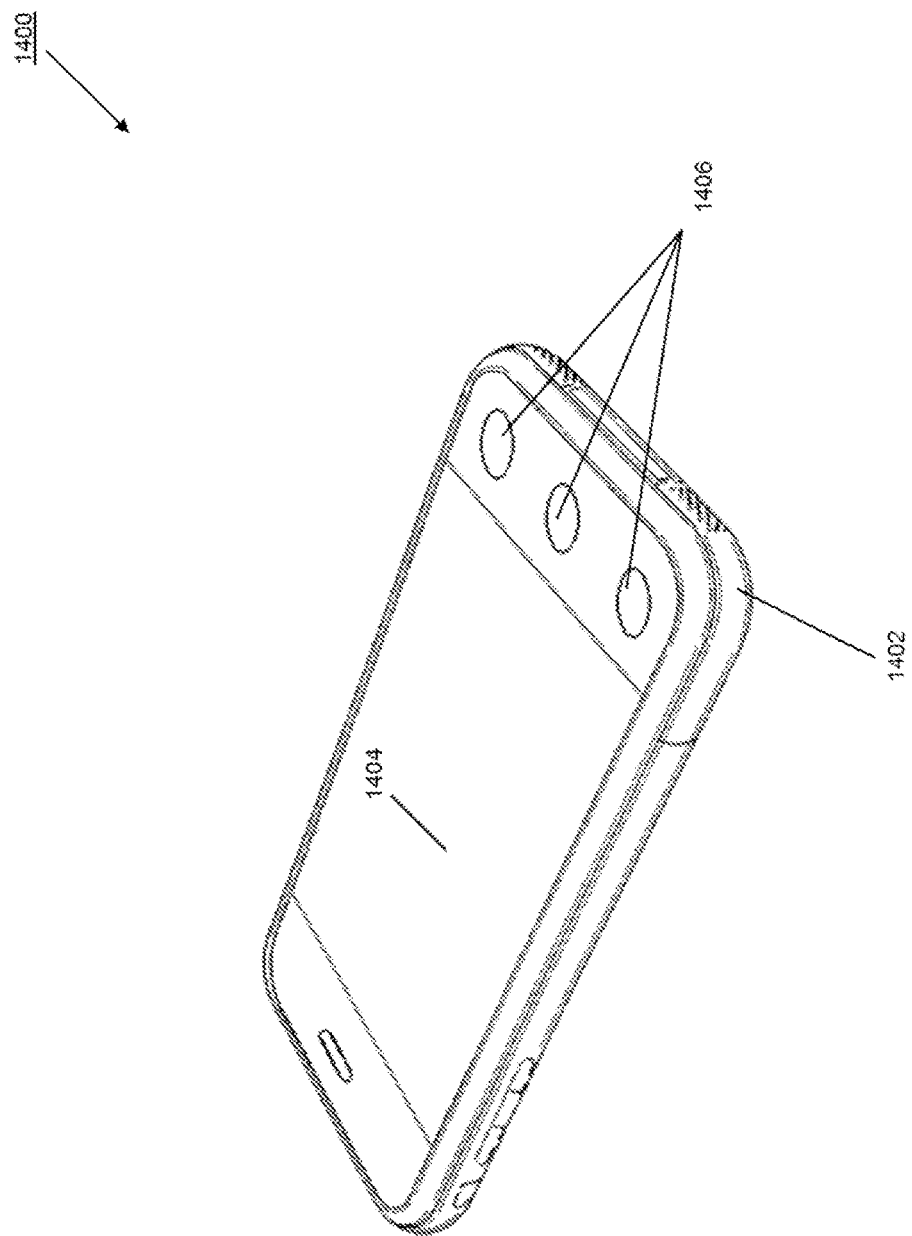
FIG. 14 is a perspective view illustrating an embodiment of a customer device.

Referring now to FIG. 14, an embodiment of a customer device 1400 is illustrated. The customer device 1400 may be the customer devices discussed above. The customer device 1400 includes a chassis 1402 having a display 1404 and an input device including the display 1404 and a plurality of input buttons 1406. One of skill in the art will recognize that the customer device 1400 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 15:
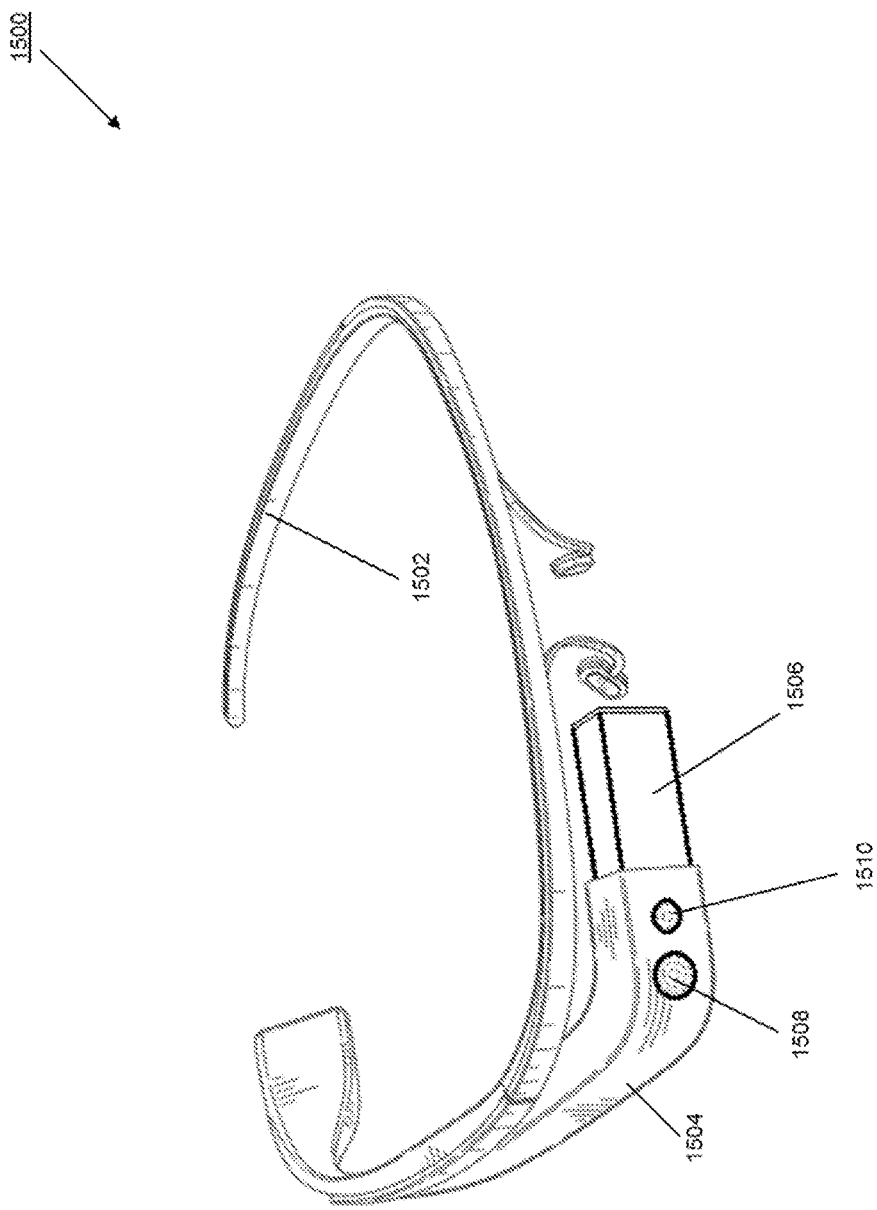
FIG. 15 is a perspective view illustrating an embodiment of a wearable device.

Referring now to FIG. 15, an embodiment of a wearable device 1500 is illustrated. The wearable device 1500 may be the may be the wearable customer devices or wearable merchant devices, discussed above. The wearable device 1500 includes a frame 1502 having a computing chassis 1504 that extends from the frame 1502, a display device 1506 that extends from the computing chassis 1504, a microphone 1508 located on the computing chassis 1504, and a camera 1510 located on the computing chassis 1504. One of skill in the art will recognize that the wearable merchant device 2100 is a mobile wearable merchant device such as, for example, Google Glass® available from Google Inc. of Mountain View, Calif. that may provide a customer with the functionality discussed above with reference to the methods discussed above. However, a variety of other mobile wearable merchant devices (e.g., the smart watches discussed above) may be used in the methods discussed above without departing from the scope of the present disclosure.

Figure 16:
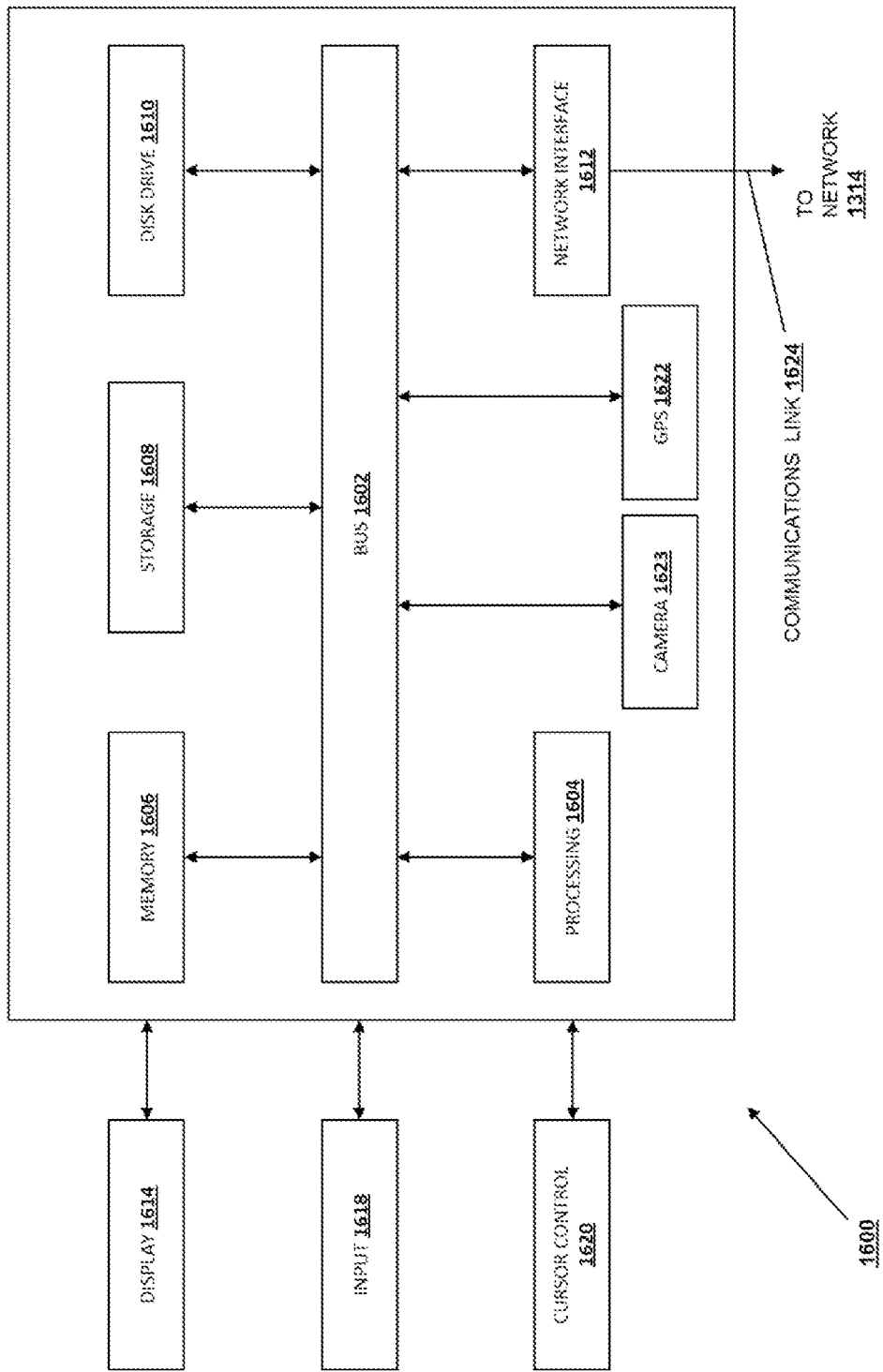
FIG. 16 is a schematic view illustrating an embodiment of a computer system.

Referring now to FIG. 16, an embodiment of a computer system 1600 suitable for implementing, for example, the customer devices, merchant devices, beacon devices, merchant beacon communication devices, payment service provider device, and/or system provider device, is illustrated. It should be appreciated that other devices utilized by customers, merchants, beacon devices, merchant beacon communication devices, payment service providers, and/or system providers in the system discussed above may be implemented as the computer system 1600 in a manner as follows.

In accordance with various embodiments of the present disclosure, computer system 1600, such as a computer and/or a network server, includes a bus 1602 or other communication mechanism for communicating information, which interconnects subsystems and components, such as a processing component 1604 (e.g., processor, micro-controller, digital signal processor (DSP), etc.), a system memory component 1606 (e.g., RAM), a static storage component 1608 (e.g., ROM), a disk drive component 1610 (e.g., magnetic or optical), a network interface component 1612 (e.g., modem or Ethernet card), a display component 1614 (e.g., CRT or LCD), an input component 1618 (e.g., keyboard, keypad, or virtual keyboard), a cursor control component 1620 (e.g., mouse, pointer, or trackball), a location determination component 1622 (e.g., a Global Positioning System (GPS) device as illustrated, a cell tower triangulation device, and/or a variety of other location determination devices known in the art), and/or a camera component 1623. In one implementation, the disk drive component 160 may comprise a database having one or more disk drive components.

In accordance with embodiments of the present disclosure, the computer system 1600 performs specific operations by the processing component 1604 executing one or more sequences of instructions contained in the memory component 1606, such as described herein with respect to the customer devices, merchant devices, beacon devices, merchant beacon communication devices, payment service provider device, and/or system provider device. Such instructions may be read into the system memory component 1606 from another computer readable medium, such as the static storage component 1608 or the disk drive component 1610. In other embodiments, hard-wired circuitry may be used in place of or in combination with software instructions to implement the present disclosure.

Logic may be encoded in a computer readable medium, which may refer to any medium that participates in providing instructions to the processing component 1604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1610, volatile media includes dynamic memory, such as the system memory component 1606, and transmission media includes coaxial cables, copper wire, and fiber optics, including wires that comprise the bus 1602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1600. In various other embodiments of the present disclosure, a plurality of the computer systems 1600 coupled by a communication link 1624 to the network 1314 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1600 may transmit and receive messages, data, information and instructions, including one or more programs (i.e., application code) through the communication link 1624 and the network interface component 1612. The network interface component 1612 may include an antenna, either separate or integrated, to enable transmission and reception via the communication link 1624. Received program code may be executed by processing component 1604 as received and/or stored in disk drive component 1610 or some other non-volatile storage component for execution.

Figure 17:
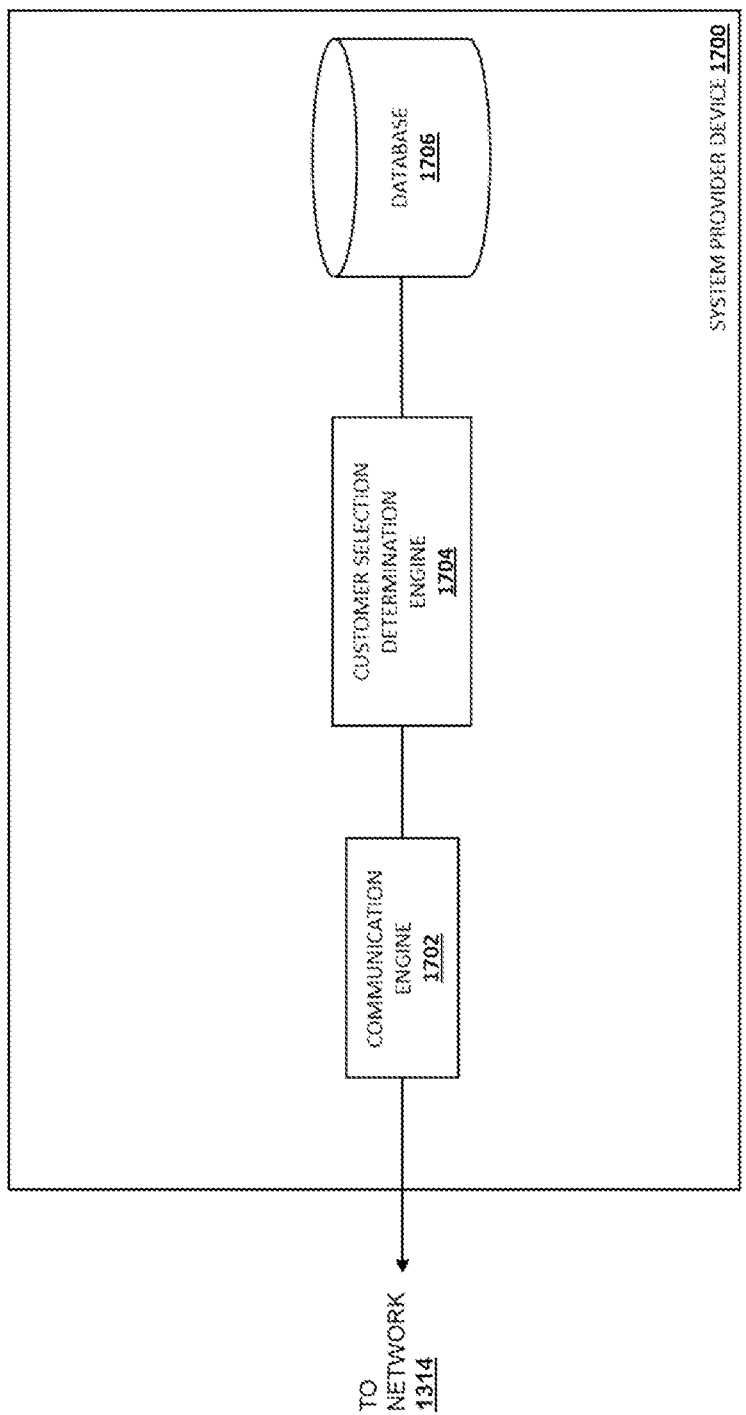
FIG. 17 is a schematic view illustrating an embodiment of a system provider device.

Referring now to FIG. 17, an embodiment of a system provider device 1700 is illustrated. In an embodiment, the device 1700 may be the system provider device discussed above. The device 1700 includes a communication engine 1702 that is coupled to the network 1314 and to a customer selection determination engine 1704 that is coupled to an information database 1706. The communication engine 1702 may be software or instructions stored on a computer-readable medium that allows the device 1700 to send and receive information over the network 134. The customer selection determination engine 1704 may be software or instructions stored on a computer-readable medium that is configured to store product locations for products in a physical merchant location in the database 1706, store customer physical measurements in the database 1706, receive customer information, analyze customer information to determine a product location a customer is selecting, determine products associated with product locations in the database 1706, provide product information to customer and/or merchant devices, as well as provide any of the other functionality that is discussed above. While the database 1706 has been illustrated as located in the device 1700, one of skill in the art will recognize that it may be connected to the customer selection determination engine 1704 through the network 1314 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A customer selection determination system, comprising:
    a non-transitory memory storing instructions; and
    one or more hardware processors configured to execute the instructions to cause the system to perform operations including:
        accessing product location information indicating a plurality of product locations within a physical merchant location and respective products associated with each of the plurality of product locations;
        receiving customer location information and customer orientation information from at least one beacon device of a plurality of beacon devices that are located in the physical merchant location, wherein the customer location information and the customer orientation information are collected by the at least one beacon device from at least one customer device that is associated with a customer;
        selecting a first location of a plurality of locations based on the customer location information, the physical merchant location comprising the plurality of locations, the first location indicating a physical location of the customer at the physical merchant location;
        capturing customer selection indication data that is based, at least in part, on the customer orientation information received from the at least one beacon device;
        determining that the customer selection indication data indicates that the customer is extending an arm and providing a directional indication with a hand on the arm without physically contacting a product or a product indicator that is located in the physical merchant location;
        determining a product location of the plurality of product locations that the customer is selecting, said determining the product location based on a relationship between the first location, a customer physical measurement, and the customer selection indication data;
determining that the product location is associated with the product indicator that indicates one or more products at the physical merchant location; and
determining in response to a determination that the product location is associated with the product indicator, a product of the one or more products that is indicated by the product indicator.

2. The system of claim 1 wherein the customer orientation information is collected by the at least one beacon device from a plurality of customer devices associated with the customer.

3. The system of claim 1, wherein the customer selection indication data includes customer gesture information that is collected by a gesture capturing device that does not communicate with the at least one customer device.

4. The system of claim 1, wherein the operations further include:
retrieving at least one customer physical measurement from a database; and
wherein said determining the product location comprises determining a distance between the first location and a set of product locations based on the customer physical measurement,
wherein the customer selection indication data is used to determine the product location from the set of product locations.

5. The system of claim 1, wherein said determining the product comprises:
accessing product order history for the customer;
determining a plurality of product candidates based on the product indicator, wherein said determining the product comprises selecting, based on the product order history, the product from the plurality of product candidates, wherein the plurality of product candidates comprise the one or more products; and
retrieving product information for the product.

6. The system of claim 1, wherein to the operations further comprise:
transmitting product information over a network to the at least one customer device, the product information indicating the product for generation of a purchase transaction with a merchant server associated with physical merchant location.

7. The system of claim 1, wherein operations further comprise:
transmitting a signal to the product indicator at the physical merchant location, wherein the signal causes the product indicator to provide at least one of a visual or physical indication of the selection of the product.

8. A method for determining a customer selection, comprising:
accessing, by a system provider device, product location information indicating a plurality of product locations within a physical merchant location and respective products associated with each of the plurality of product locations;
receiving, by the system provider device, customer location information and customer orientation information over a network from at least one beacon device of a plurality of beacon devices that are located in a physical merchant location, wherein the customer location information and the customer orientation information are collected by the at least one beacon device from at least one customer device that is associated with a customer;
selecting, by the system provider device, a first location of a plurality of locations based on the customer location information, the physical merchant location comprising the plurality of locations, the first location indicating a physical location of the, customer at, the physical merchant location;
determining, by the system provider device using customer selection indication data that is generated using at least the customer orientation information received from the at least one beacon device, that the customer is extending an arm and providing a directional indication with a hand on the arm without physically contacting a product or a product indicator that is located in the physical merchant location;
determining, by the system provider device, a product location in the physical merchant location that the customer is selecting, said determining the product location based on a relationship between the first location, a customer physical measurement, and at least one physical gesture;
determining, by the system provider device, that the product location is associated with the product indicator that indicates one or more products at the physical merchant location; and
determining, by the system provider device in a database in response to a determination that the product location is associated with the product indicator, a product that is indicated by the product indicator.

9. The method of claim 8, wherein the customer orientation information is collected by the at least one beacon device from a plurality of customer devices associated with the customer.

10. The method of claim 8, wherein the customer selection indication data includes customer gesture information that is collected by a gesture capturing device that does not communicate with the at least one customer device.

11. The method of claim 8, further comprising:
retrieving, by the system provider device, at least one customer physical measurement from a database, wherein said determining the product location comprises determining a distance between the first location and a set of product locations based on the customer physical, measurement,
wherein the customer selection indication data is used to determine the product location from the set of product locations.

12. The method of claim 11, wherein said determining the product comprises:
accessing product order history for the customer;
determining a plurality of product candidates based on the product indicator, wherein said determining the product comprises selecting, based on the product order history, the product from the plurality of product candidates, wherein the plurality of product candidates comprise the one or more products; and
retrieving, by the system provider device, product information for the product.

13. The method of claim 8, further comprising:
sending, by the system provider device, a signal to the product indicator at the physical merchant location, wherein the, signal causes the product indicator to provide at least one of a visual or physical indication of the selection of the product.

14. A non-transitory machine-readable medium comprising a plurality of machine-readable instructions, the instructions executable of perform operations comprising:
  accessing product location information indicating a plurality of product locations within a physical merchant location and respective products associated with each of the plurality of product locations;
  receiving customer location information and customer orientation information from at least one beacon device of a plurality of beacon devices that are located in a physical merchant location, wherein the customer location information and the customer orientation information are collected by the at least one beacon device from at least one customer device that is associated with a customer;
  selecting a first location of a plurality of locations based on the customer location information, the physical merchant location comprising the plurality of locations, the first, location indicating a physical location of the customer at the physical merchant location;
  receiving customer selection indication data that is based, at least in part, on the customer orientation information;
  determining that the customer selection indication data indicates that the customer is extending an arm and providing a directional indication with a hand on the arm without physically contacting a product or a product indicator that is located in the physical merchant location;
  determining a product location in the physical merchant location that the customer is selecting, said determining the product location based on a relationship between the first location, a customer physical measurement, and the customer selection indication data;
  determining that the product location is associated with the product indicator that indicates one or more products at the physical merchant location; and
  identifying, in a database response to a determination that the product location is associated with the product indicator, a product, that is indicated by the product indicator.

15. The non-transitory machine-readable medium of claim 14, wherein the customer orientation information is collected by the at least one beacon device from the customer device: and
  wherein said determining the product location is further based on the customer orientation information.

16. The non-transitory machine-readable medium of claim 14, wherein the customer orientation information is collected by the at least one beacon device from a plurality of customer devices associated with the customer.

17. The non-transitory machine-readable medium of claim 14 wherein the customer selection indication data includes customer gesture information that is collected by a gesture capturing device that does not communicate with the at least one customer device.

18. The non-transitory machine-readable medium of claim 14, wherein the operations further comprise:
  retrieving at least one customer physical measurement from a database, wherein said determining the product: location comprises determining distance between the first location and a set of product locations based on the customer physical measurement,
  wherein the customer selection indication data is used to determine the product location from the set of product locations.

19. The non-transitory machine-readable medium of claim 18, wherein said determining the product comprises:
  retrieving product information for the product based on the product location and
  providing the product information to the customer device.

20. The non-transitory machine-readable medium of claim 14, wherein the operations further comprise:
  sending a signal to a product indicator device in the physical merchant location, wherein the signal causes the product indicator device to provide at least one of a visual or physical indication of the selection of the product.

* * * * *